(12) United States Patent
Yokura et al.

(10) Patent No.: US 8,106,471 B2
(45) Date of Patent: Jan. 31, 2012

(54) SEMICONDUCTOR DYNAMIC QUANTITY SENSOR AND METHOD OF PRODUCING THE SAME

(75) Inventors: Hisanori Yokura, Obu (JP); Tetsuo Fujii, Toyohashi (JP)

(73) Assignee: DENSO CORPORATION, Kariya (JP)

( * ) Notice: Subject to any disclaimer, the term of this patent is extended or adjusted under 35 U.S.C. 154(b) by 120 days.

(21) Appl. No.: 12/588,421

(22) Filed: Oct. 15, 2009

(65) Prior Publication Data
US 2010/0117167 A1 May 13, 2010

(30) Foreign Application Priority Data
Nov. 10, 2008 (JP) ................................. 2008-287823

(51) Int. Cl.
*H01L 29/788* (2006.01)
(52) U.S. Cl. ................. 257/417; 257/418; 257/E29.324
(58) Field of Classification Search .................. 257/417, 257/418, E29.324
See application file for complete search history.

(56) References Cited

U.S. PATENT DOCUMENTS

| 2002/0158293 A1 | 10/2002 | Lee et al. |
| 2003/0210511 A1 | 11/2003 | Sakai et al. |
| 2005/0051910 A1 | 3/2005 | Goto et al. |
| 2006/0213268 A1 | 9/2006 | Asami et al. |
| 2011/0108933 A1* | 5/2011 | Nakatani ........................ 257/415 |

FOREIGN PATENT DOCUMENTS

| JP | A-07-140167 | 6/1995 |
| JP | A-2008-064603 | 3/2008 |

* cited by examiner

*Primary Examiner* — Ngan Ngo
(74) *Attorney, Agent, or Firm* — Posz Law Group, PLC

(57) ABSTRACT

A semiconductor dynamic quantity sensor includes a sensor part and a cap connected to the sensor part. Dynamic quantity is detected based on a capacitance of a capacitor defined between a movable electrode and a fixed electrode of the sensor part. A float portion of the sensor part is separated from a support board of the sensor part to define a predetermined interval. At least one of the cap and the support board has a displacing portion displacing the float portion in a direction perpendicular to the support board so as to change the predetermined interval. The movable electrode has a displacement in accordance with the displaced float portion.

14 Claims, 14 Drawing Sheets

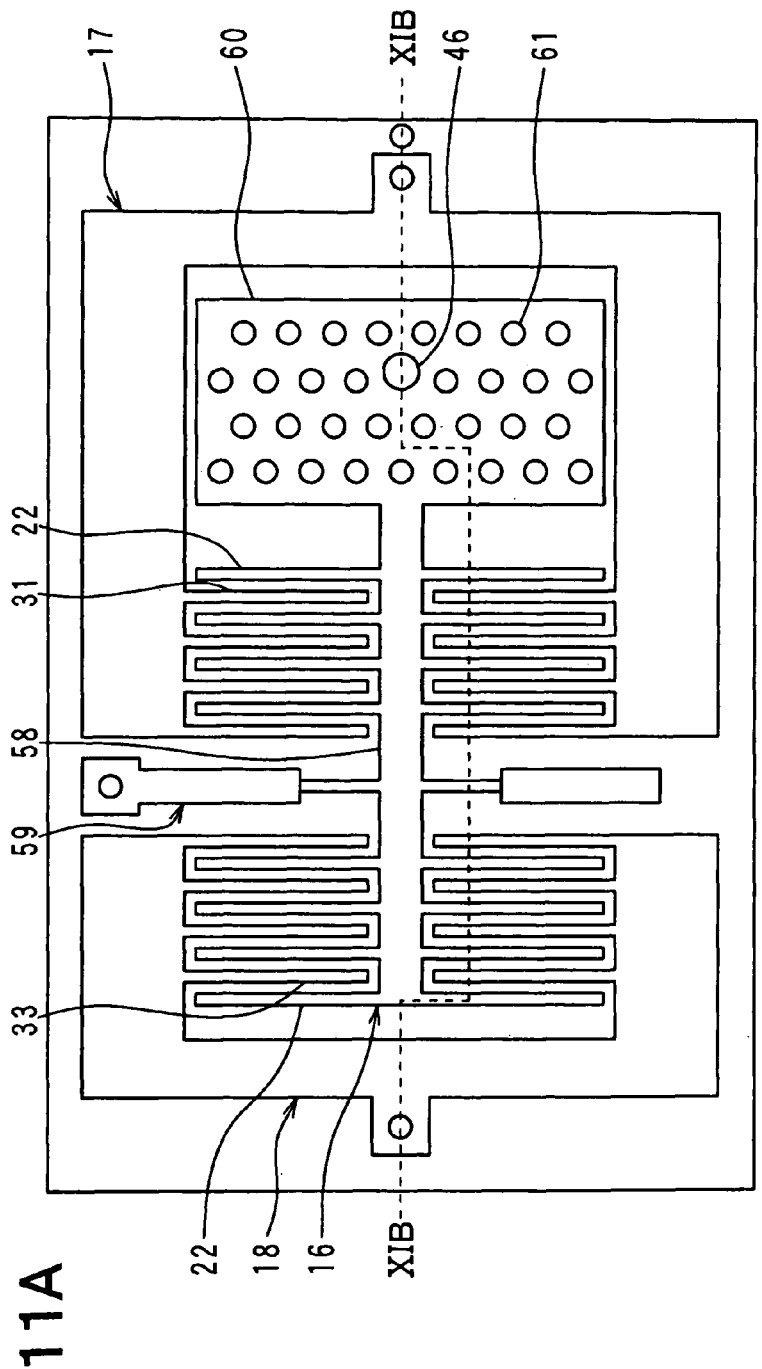
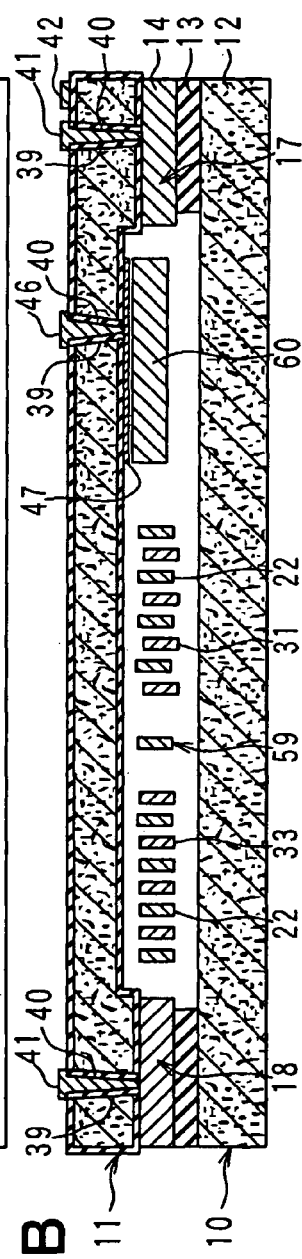
FIG. 11A
FIG. 11B

# SEMICONDUCTOR DYNAMIC QUANTITY SENSOR AND METHOD OF PRODUCING THE SAME

CROSS REFERENCE TO RELATED APPLICATION

This application is based on Japanese Patent Application No. 2008-287823 filed on Nov. 10, 2008, the disclosure of which is incorporated herein by reference in its entirety.

BACKGROUND OF THE INVENTION

1. Field of the Invention

The present invention relates to a semiconductor dynamic quantity sensor and a method of producing the sensor.

2. Description of Related Art

JP-A-2003-014778 corresponding to US 2002/0158293 A1 discloses an acceleration sensor to detect acceleration in a direction perpendicular to a substrate. The acceleration sensor includes a movable electrode and a fixed electrode to oppose to each other. The movable electrode and the fixed electrode are separated from the substrate. A dimension of the movable electrode is different from that of the fixed electrode in the perpendicular direction.

When the movable electrode is moved relative to the fixed electrode in the perpendicular direction, opposing area between the movable electrode and the fixed electrode is decreased, because the movable electrode is out of alignment with the fixed electrode. Acceleration in the perpendicular direction can be detected based on a capacitance decrease of a capacitor defined between the movable electrode and the fixed electrode.

JP-A-2006-266873 corresponding to US 2006/0213268 A1 discloses an acceleration sensor to detect acceleration in a direction perpendicular to a substrate. The sensor has a seesaw structure, and a capacitor constructed by a movable electrode and a fixed electrode is defined at each end of the seesaw structure. When the seesaw structure is moved like a seesaw, a capacitance difference is obtained between the capacitors defined at the ends of the seesaw structure. Therefore, a direction of the detected perpendicular acceleration can be determined to head upward or downward relative to the substrate.

However, the acceleration sensor disclosed in JP-A-2003-014778 cannot determine a heading direction of the detected perpendicular acceleration. When the movable electrode moves in a second direction opposite from a first direction, the decrease of the opposing area is the same as the movable electrode moves in the first direction.

Further, the acceleration sensor disclosed in JP-A-2006-266873 cannot detect acceleration in a direction other than the perpendicular direction. That is, multi-axis acceleration cannot be detected by the acceleration sensor constructed by a single detection element.

If plural detection elements are needed to detect the multi-axis acceleration, cost of producing the acceleration sensor may increase, and a size of the acceleration sensor may be large.

SUMMARY OF THE INVENTION

In view of the foregoing and other problems, it is an object of the present invention to provide a semiconductor dynamic quantity sensor and a method of producing the semiconductor dynamic quantity sensor.

According to a first example of the present application, a semiconductor dynamic quantity sensor includes a sensor part and a cap. The sensor part has a support board and a sensor structure arranged on the support board. The sensor structure includes a movable part having a movable electrode and a fixed part having a fixed electrode. The sensor structure detects dynamic quantity based on a capacitance of a capacitor defined between the movable electrode and the fixed electrode. The cap is connected to the sensor part so as to cover the sensor structure between the cap and the support board. The movable part has a float portion separated from the support board, and a predetermined interval is defined between the float portion and the support board. At least one of the cap and the support board has a displacing portion displacing the float portion in a direction perpendicular to the support board so as to change the predetermined interval. The movable electrode has a displacement in the perpendicular direction relative to the fixed electrode in accordance with the displaced float portion, so as to decrease an overlap area between the movable electrode and the fixed electrode. The sensor structure detects dynamic quantity applied in the perpendicular direction based on a change of the overlap area, when dynamic quantity is applied to the movable electrode in the perpendicular direction. The sensor structure detects dynamic quantity applied in a plane direction of the support board based on a separation distance between the movable electrode and the fixed electrode, when dynamic quantity is applied to the movable electrode in the plane direction.

According to a second example of the present application, a semiconductor dynamic quantity sensor includes a support board and a sensor structure arranged on the support board. The sensor structure includes a movable part having a movable electrode and a fixed part having a fixed electrode. The sensor structure detects dynamic quantity based on a capacitance of a capacitor defined between the movable electrode and the fixed electrode. The movable part has a float portion separated from the support board to define a predetermined interval between the float portion and the support board. The support board has a displacing portion displacing the float portion in a direction perpendicular to the support board so as to change the predetermined interval. The movable electrode has a displacement in the perpendicular direction relative to the fixed electrode in accordance with the displaced float portion, so as to decrease an overlap area between the movable electrode and the fixed electrode. The sensor structure detects dynamic quantity applied in the perpendicular direction based on a change of the overlap area, when dynamic quantity is applied to the movable electrode in the perpendicular direction. The sensor structure detects dynamic quantity applied in a plane direction of the support board based on a separation distance between the movable electrode and the fixed electrode, when dynamic quantity is applied to the movable electrode in the plane direction.

According to a third example of the present application, a method of producing a semiconductor dynamic quantity sensor includes preparing a sensor part having a support board and a sensor structure arranged on the support board, preparing a cap, connecting the sensor part and the cap so as to cover the sensor structure between the support board and the cap, forming a float portion in a movable part of the sensor structure, and forming a displacing portion on at least one of the support board and the cap so as to displace the float portion.

BRIEF DESCRIPTION OF THE DRAWINGS

The above and other objects, features and advantages of the present invention will become more apparent from the following detailed description made with reference to the accompanying drawings. In the drawings:

FIG. 11A is a schematic plan view illustrating an acceleration sensor according to a fourth embodiment, and FIG. 11B is a schematic cross-sectional view taken along line XIB-XIB of FIG. 11A;

DETAILED DESCRIPTION OF PREFERRED EMBODIMENT

First Embodiment

A semiconductor dynamic quantity sensor may be a capacitive acceleration sensor used for controlling airbag, antilock brake system (ABS), or vehicle stability control (VSC), for example.

Figure 1A:
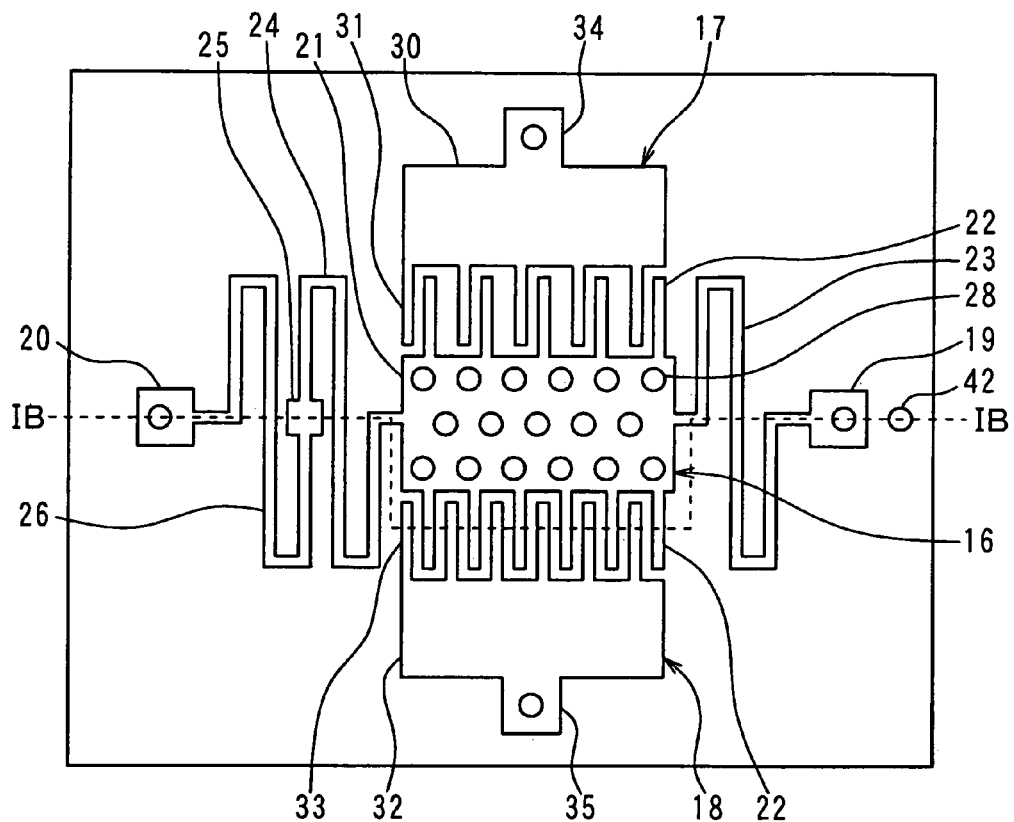
FIG. 1A is a schematic plan view illustrating an acceleration sensor according to a first embodiment.
Figure 1B:
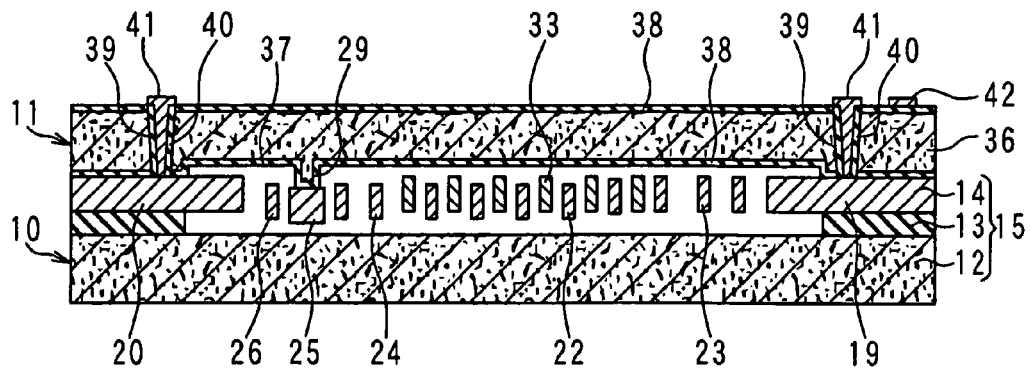
FIG. 1B is a schematic cross-sectional view taken along line IB-IB of FIG. 1A.

As shown in FIG. 1B, the acceleration sensor includes a board-shaped sensor part 10 and a board-shaped cap 11, which are connected with each other.

The sensor part 10 is made of a silicon on insulator (SOI) substrate 15 including a silicon layer 14 stacked on a support board 12 through a buried oxide film 13.

The support board 12 is made of n-type silicon, for example. The buried oxide film 13 is arranged to define a predetermined interval between the support board 12 and the silicon layer 14. A part of the buried oxide film 13 is eliminated.

As shown in FIG. 1A, the silicon layer 14 is used for patterning a movable part 16, a fixed part 17 used for detecting acceleration in a plane direction, and a fixed part 18 used for detecting acceleration in a perpendicular direction. Specifically, the movable part 16 is constructed by the silicon layer 14 located on an eliminated oxide film. In contrast, the fixed part 17, 18 is constructed by the silicon layer 14 located on a remaining oxide film.

The movable part 16 includes a first output 19, a second output 20, a weight 21, a movable electrode 22, a first beam 23, a second beam 24, a beam support 25 and a third beam 26.

The output 19, 20 electrically connects the movable part 16 and outside. The buried oxide film 13 remains under the output 19, 20, and the output 19, 20 is fixed to the support board 12 through the oxide film 13. The output 19, 20 has a diffusion layer 27 shown in FIG. 2C. When the diffusion layer 27 is electrically connected to outside, an electric potential of the movable part 16 can be output outside.

When acceleration is applied to the acceleration sensor, the movable electrode 22 is moved relative to the fixed part 17, 18, due to the weight 21. The weight 21 has a block shape, and plural etching holes 28 are defined in the weight 21. A plane layout of the weight 21 is shaped into a rectangle.

A plurality of the movable electrodes 22 extends approximately perpendicular to a long side of the weight 21 so as to have a comb-teeth shape. Widths and lengths of the movable electrodes 22 are uniform.

The weight 21 has a first long side and a second long side, and an interval between the electrodes 22 connected to the second long side is narrow compared with that connected to the first long side.

The electrodes 22 connected to the first long side opposing to the fixed part 17 are used for detecting acceleration in a longitudinal direction of the weight 21 and in a plane direction of the support board 12. The number of the electrodes 22 to detect acceleration in the plane direction is five, for example.

The electrodes 22 connected to the second long side opposing to the fixed part 18 are used for detecting acceleration in a perpendicular direction relative to the support board 12. The number of the electrodes 22 to detect acceleration in the perpendicular direction is six, for example.

The first beam 23 connects the first output 19 and the weight 21, and has spring characteristic. An end of the first beam 23 is connected to the weight 21, and the other end of the first beam 23 is connected to the first output 19. The first beam 23 has wave-like bent shape, and has a width of 4 μm, for example.

The second beam 24 connects the weight 21 and the beam support 25, and has the same spring constant as the first beam 23. An end of the second beam 24 is connected to the weight 21 opposite from the first beam 23, and the other end of the first beam 24 is connected to the beam support 25. The second beam 24 has wave-like bent shape, and has a width of 4 μm, for example, similar to the first beam 23.

The beam support 25 connects the second beam 24 and the third beam 26, and is separated from the support board 12 by a predetermined interval. The predetermined interval represents an interval between the beam support 25 and the support board 12 in a state that a projection 29 of the cap 11 does not contact the support beam 25. That is, the predetermined interval does not correspond to an interval between the beam support 25 and the support board 12 shown in FIG. 1B. In FIG. 1B, the beam support 25 is moved toward the support beam 12 by the projection 29.

The beam support 25 has a rectangular plane shape, and a width of the beam support 25 is large compared with those of the second beam 24 and the third beam 26. A side length of the beam support 25 is about 20 µm, for example.

The third beam 26 connects the beam support 25 and the second output 20, and has spring characteristics. An end of the third beam 26 is connected to the beam support 25, and the other end of the third beam 26 is connected to the second output 20. Because the beam support 25 is pressed by the projection 29 of the cap 11 so as to fix the position of the beam support 25, movement of the third beam 26 does not accord with movement of the weight 21. Therefore, a spring constant of the third beam 26 need not to be equal to that of the first beam 23 or the second beam 24. The third beam 26 has wave-like bent shape, and has a width of 4 µm, for example.

The first beam 23, the weight 21, the second beam 24, the beam support 25 and the third beam 26 are separated from the support board 12, because the oxide film 13 is eliminated. Therefore, the movable part 16 is displaceable in the plane direction and the perpendicular direction of the support board 12, in a state that the first beam 23, the weight 21, the second beam 24, the beam support 25 and the third beam 26 are supported by the output 19, 20.

The fixed part 17, 18 is located to oppose to the long side of the rectangular weight 21 constructing the movable part 16.

The fixed part 17 is used for detecting acceleration in the plane direction of the support board 12, and is located to oppose to the first long side of the weight 21 having five of the movable electrodes 22.

The fixed part 18 is used for detecting acceleration in the perpendicular direction of the support board 12, and is located to oppose to the second long side of the weight 21 having six of the movable electrodes 22.

The fixed part 17 has a wiring 30 and fixed electrodes 31. The fixed part 18 has a wiring 32 and fixed electrodes 33.

The wiring 30, 32 electrically connects the fixed electrode 31, 33 and outside. The buried oxide film 13 remains under the wiring 30, 32, and the wiring 30, 32 is fixed to the support board 12 through the oxide film 13.

The fixed electrodes 31, 33 extend in a direction approximately perpendicular to a face of the wiring 30, 32 opposing to the weight 21 so as to have a comb-teeth shape. Widths and lengths of the fixed electrodes 31, 33 are uniform. The fixed electrode 31, 33 is fixed to the support board 12 through the wiring 30, 32, because the oxide film 13 is not left under the fixed electrode 31, 33. That is, the fixed electrode 31, 33 is separated from the support board 12.

A capacitor is defined between the fixed electrode 31 and the movable electrode 22, when the fixed electrode 31 is located to oppose to the movable electrode 22 to detect acceleration in the plane direction. In this case, the movable electrode 22 is located between two of the fixed electrodes 31, but is located adjacent to one of the fixed electrodes 31. When acceleration is applied in the plane direction of the support board 12, the acceleration can be detected based on a capacitance of the capacitor corresponding to a distance between the movable electrode 22 and one of the fixed electrodes 31 without being affected by the other fixed electrode 31.

A capacitor is defined between the fixed electrode 33 and the movable electrode 22, when the fixed electrode 33 is located to oppose to the movable electrode 22 to detect acceleration in the perpendicular direction. In this case, a separation distance between the fixed electrode 33 and the movable electrode 22 is constant, because the movable electrode 22 moves in the perpendicular direction relative to the support board 12. A capacitance variation of the capacitor is detected based on an opposing area variation between the movable electrode 22 and the fixed electrode 33. Therefore, the separation distance is not related to the capacitance variation to detect the acceleration in the perpendicular direction.

The fixed part 17 has a third output 34 electrically connected to outside, and the fixed part 18 has a fourth output 35 electrically connected to outside, similar to the movable part 16.

The silicon layer 14 other than the movable part 16 and the fixed part 17, 18 remains as a periphery part. However, the periphery part is omitted in FIG. 1A.

A sensor structure to detect acceleration is defined by the movable part 16 and the fixed part 17, 18.

The cap 11 of the acceleration sensor restricts water and foreign object from entering the sensor structure, and is made of a silicon substrate 36.

As shown in FIG. 1B, the silicon substrate 36 has a recess 37 recessed from the sensor part 10. When the cap 11 and the sensor part 10 are stacked, the cap 11 is restricted from contacting the movable part 16, for example, due to the recess 37.

The recess 37 has a displacing portion for displacing the beam support 25 in the perpendicular direction of the support board 12 so as to change a predetermined interval between the support board 12 and the beam support 25. The displacing portion may be the projection 29, which has a column shape and protrudes from the cap 11 opposing to the beam support 25. A plane size of the projection 29 is smaller than that of the beam support 25.

An insulating oxide film 38 is arranged on a first face of the cap 11 opposing to the sensor part 10, and a second face of the cap 11 opposite from the sensor part 10. The sensor structure is insulated from the cap 11, due to the oxide film 38.

A hole 39 is defined to pass through the cap 11, and an insulation film 40 is arranged on a side wall of the hole 39. An output electrode 41 is arranged in the hole 39. An end of the output electrode 41 is exposed to the sensor part 10, and the other end of the output electrode 41 is exposed opposite from the sensor part 10.

The output electrode 41 is located to oppose to the output 19, 20, 34, of the movable part 16 and the fixed part 17, 18, respectively. An end of the output electrode 41 contacts the output 19, 20, 34, 35, and the other end of the output electrode 41 is connected to outside through a wire, for example. Thus, the sensor part 10 is electrically connected to outside.

The cap 11 further has an output electrode 42 only for the cap 11, for example, other than the output electrode 41.

As shown in FIG. 1B, the sensor structure is covered between the support board 12 and the cap 11, when the sensor part 10 and the cap 11 are joined.

Specifically, when the cap 11 is stacked above the sensor part 10, the projection 29 of the cap 11 contacts the beam support 25 of the sensor part 10, and the beam support 25 is pressed toward the support board 12 by the projection 29. Therefore, the beam support 25 is displaced in the perpendicular direction relative to the support board 12, and the predetermined interval between the support board 12 and the beam support 25 becomes small.

Position of the beam support 25 is fixed in the perpendicular direction of the support board 12, in a state that the beam support 25 is pressed by the projection 29. Therefore, the weight 21 of the movable part 16 vibrates between the output 19 and the beam support 25, due to the spring characteristics of the first beam 23 and the second beam 24.

Further, the second beam 24 connected to the beam support 25 is indirectly moved toward the support board 12, because the beam support 25 is moved toward the support board 12 by the projection 29. Therefore, as shown in FIG. 1B, V-shape is formed between the outputs 19, 20 by positions of the first beam 23, the weight 21, the second beam 24, the beam support 25, and the third beam 26.

The first beam 23 is positioned adjacent to the support board 12 compared with the output 19. The weight 21 is positioned adjacent to the support board 12 compared with the first beam 23. The second beam 24 is positioned adjacent to the support board 12 compared with the weight 21. The third beam 26 is positioned adjacent to the support board 12 compared with the output 20.

Therefore, the movable electrode 22 connected to the weight 21 is moved toward the support board 12. As shown in FIG. 1B, the movable electrode 22 is moved toward the support board 12, compared with the fixed electrode 31, 33. Thus, the opposing area between the fixed electrode 31, 33 and the movable electrode 22 becomes small, when the beam support 25 is pressed by the projection 29.

A method of producing the acceleration sensor will be described.

The acceleration sensor is formed by connecting the sensor part 10 and the cap 11, after the sensor part 10 and the cap 11 are formed. A plurality of the sensor parts 10 is formed in a single wafer, and a plurality of the caps 11 is formed in a single wafer.

Figure 2A:
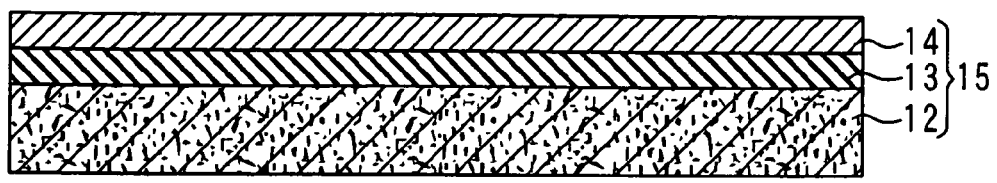
FIG. 2A, FIG. 2B and FIG. 2C are schematic cross-sectional views illustrating processes of producing a sensor part of the acceleration sensor.

A process for producing the sensor part 10 will be described. As shown in FIG. 2A, the SOI substrate 15 is prepared. Specifically, the buried oxide film 13 such as $SiO_2$ is formed on the support board 12 made of n-type single crystal silicon, for example. A silicon substrate is stacked on the buried oxide film 13, and the stacked silicon substrate is cut to be thin so as to form the silicon layer 14. Thus, the SOI substrate 15 is formed. However, a process of producing the SOI substrate 15 is not limited to the above process.

Figure 2B:
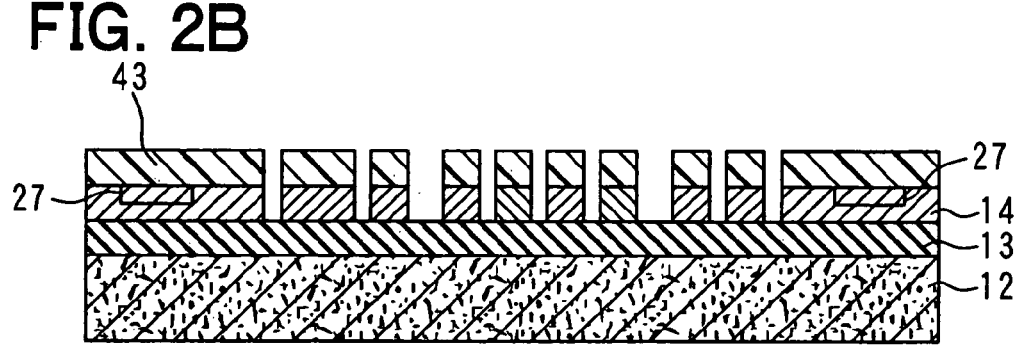

As shown in FIG. 2B, the diffusion layer 27 is formed in the silicon layer 14 to be the output 19, 20, 34, 35, and the silicon layer 14 is masked by a photo resist 43. A photolithography such as exposure, development, and post-bake is performed for vertically etching the silicon layer 14. At this time, the etching hole 28 is formed in the silicon layer 14 to be the weight 21. If a sufficient impurity concentration is secured in the silicon layer 14, the forming of the diffusion layer 27 is not needed.

Figure 2C:
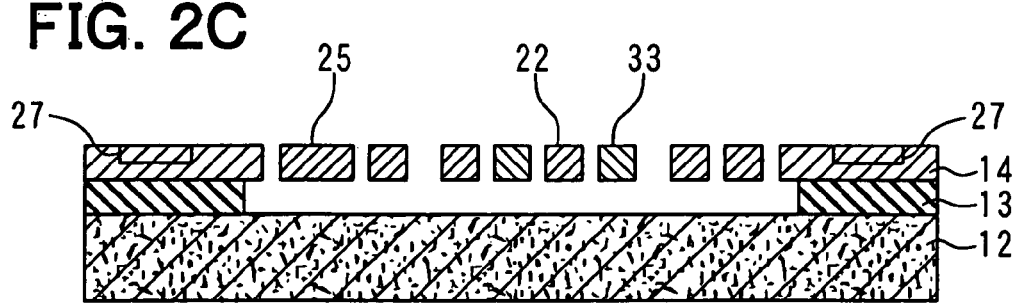

As shown in FIG. 2C, the buried oxide film 13 is removed by hydrofluoric acid, for example, between the support board 12 and the silicon layer 14 to be the beams 23, 24, 26, the weight 21, the beam support 25, the movable electrode 22 and the fixed electrode 31, 33. Therefore, the movable electrode 22 and the fixed electrode 31, 33 are released so as to form the movable part 16 and the fixed part 17, 18. Thus, the sensor part 10 having the sensor structure and the support board 12 can be produced.

Figure 3A:
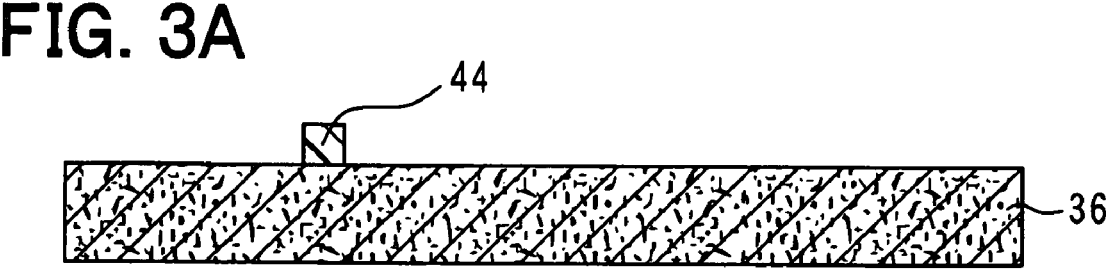
FIG. 3A is.

A process for producing the cap 11 will be described. As shown in FIG. 3A, the silicon substrate 36 to be the cap 11 is prepared, and a photo resist 44 is formed on the silicon substrate 36 to oppose to the beam support 25 of the sensor part 10 in a photolithography process. The silicon substrate 36 is etched by using the photo resist 44 as a mask. Alternatively, a glass substrate may be used as a main material of the cap 11.

Figure 3B:
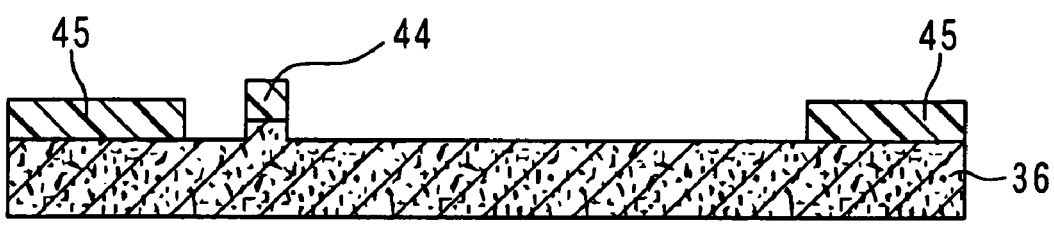
FIG. 3B and FIG. 3C are schematic cross-sectional views illustrating processes of producing a cap of the acceleration sensor.

As shown in FIG. 3B, a photo resist 45 is formed on the silicon substrate 36 to be stacked on the sensor part 10 in a photolithography process, while the photo resist 44 is left. The silicon substrate 36 is etched by using the photo resists 44, 45 as a mask. Therefore, the recess 37 is formed on the silicon substrate 36 to oppose the sensor part 10. Further, the projection 29 is formed, due to the photo resist 44.

Figure 3C:
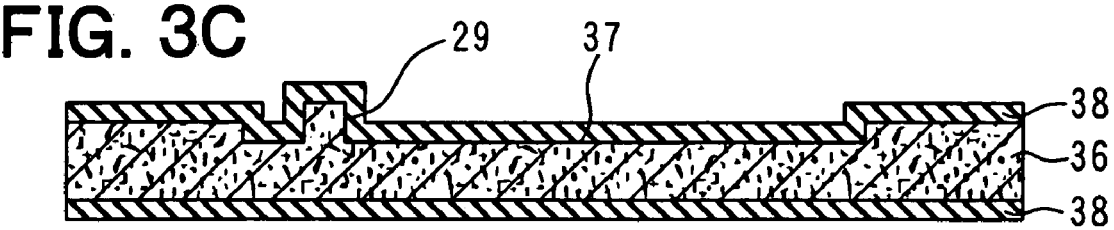

As shown in FIG. 3C, the oxide film 38 is formed on a first face of the silicon substrate 36 to oppose to the sensor part 10, and a second face of the silicon substrate 36 opposite from the sensor part 10. Thus, the cap 11 having the projection 29 to oppose the beam support 25 of the sensor part 10 can be produced. If the glass substrate is used for producing the cap 11, the forming of the oxide film 38 is not needed, because the glass substrate has an insulation property.

Figure 4A:
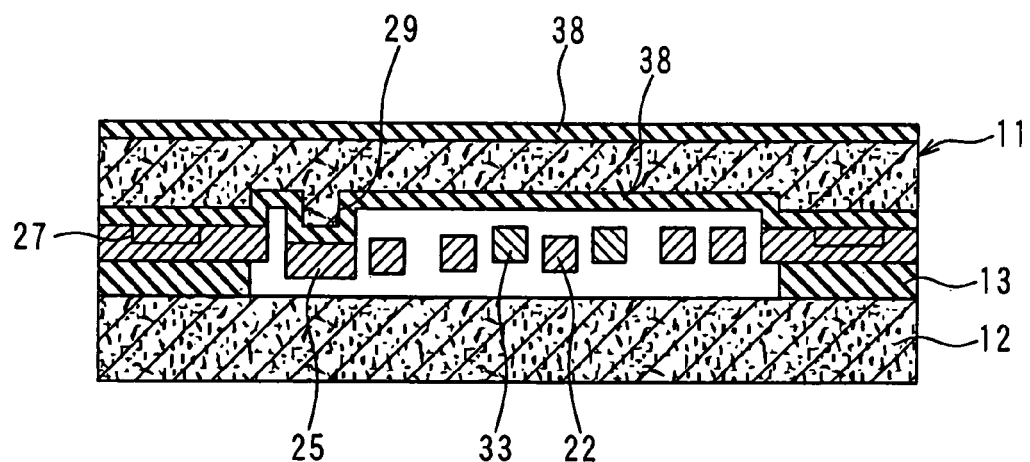
FIG. 4A and FIG. 4B are schematic cross-sectional views illustrating processes of connecting the sensor part and the cap.

As shown in FIG. 4A, the sensor part 10 and the cap 11 are directly joined. Because each of the sensor part 10 and the cap 11 is formed in the wafer, the wafers are aligned so as to join the sensor part 10 and the cap 11.

The alignment is important for contacting the projection 29 of the cap 11 with the beam support 25 of the sensor part 10 and for pressing the beam support 25 toward the support board 12. For example, an optical method to make infrared light to pass through the wafers may be used for the alignment. Alternatively, the wafers may be imaged by a scope for the alignment.

When the cap 11 and the sensor part 10 are joined, the sensor structure is covered between the support board 12 and the cap 11. At this time, the projection 29 of the cap 11 presses the beam support 25 toward the support board 12. Therefore, the interval between the support board 12 and the beam support 25 is made smaller. Further, the beam 23, 24, 26 and the weight 21 of the movable part 16 are moved toward the support board 12. Thus, the opposing area between the movable electrode 22 and the fixed electrode 31, 33 is decreased. If the glass substrate is used for producing the cap 11, anode connection can be performed between the cap 11 and the sensor part 10.

Figure 4B:
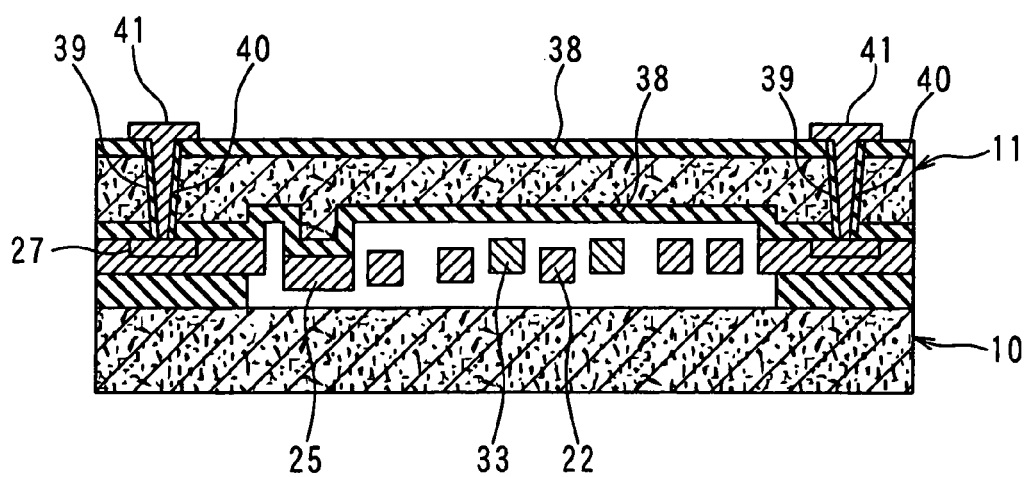

As shown in FIG. 4B, the hole 39 is formed by etching the cap 11 opposing to the output 19, 20, and the insulation film 40 is formed on the side wall of the hole 39 by a chemical vapor deposition (CVD) or coating. The insulation film 40 is made of $CVD-SiO_2$, tetraethoxysilane (TEOS), inorganic spin on glass (SOG), organic SOG, polyimide, or other organic material. The output electrode 41 is formed in the hole 39 by a vapor deposition, for example.

Electrode material may be aluminum, aluminum alloy such as Al—Si, titanium, titanium alloy such as TiN or TiW, tantalum, tantalum alloy such as TaN, single/poly crystal silicon using the CVD method or epitaxial growth method, or Si—Ge. Cu or Au plating may be performed to the output electrode 41 exposed from the cap 11, after the output electrode 41 is formed. Insulation film and electrode may be made of a material having layer structure. Further, the output electrode 42 is formed for the cap 11.

Thus, the acceleration sensor can be produced.

Figure 5A:
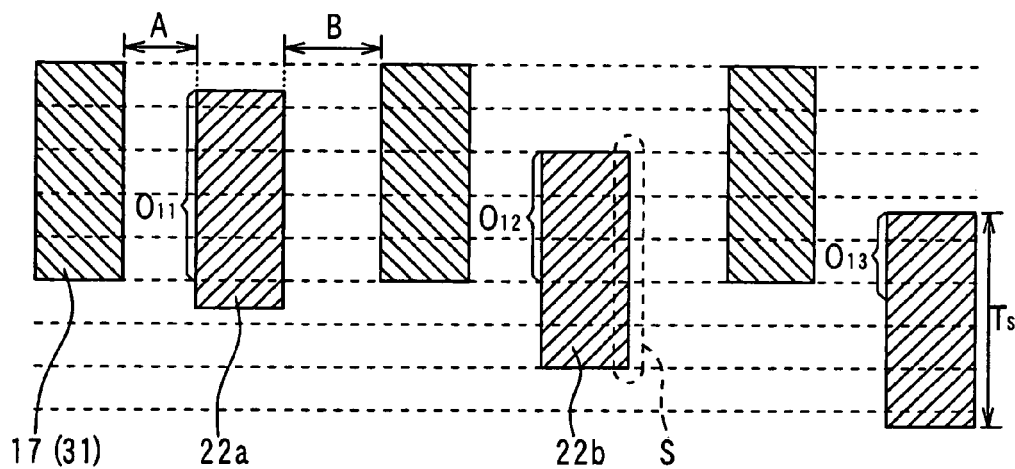
FIG. 5A is a schematic view illustrating a position relationship between a fixed part used for horizontal detection and a movable electrode when acceleration is not applied.
Figure 6A:
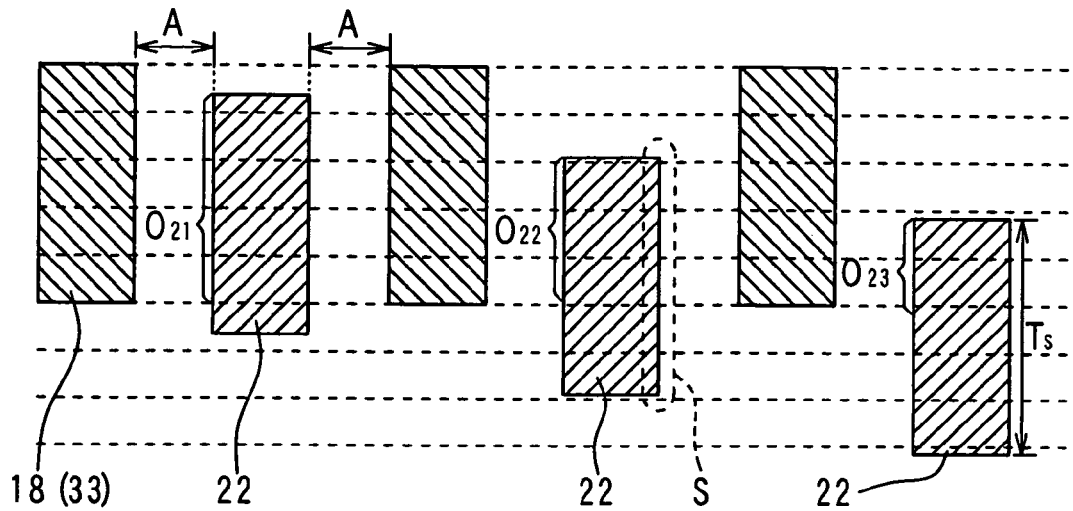
FIG. 6A is a schematic view illustrating a position relationship between a fixed part used for perpendicular detection and a movable electrode when acceleration is not applied.

A method of detecting acceleration by using the acceleration sensor will be described. As shown in FIG. 5A and FIG. 6A, the fixed electrode 31, 33 of the fixed part 17, 18 and the movable electrode 22 have a thickness Ts and a side face area S.

When acceleration is not applied, a movable electrode 22a located the most outside among the movable electrodes 22 has an overlap dimension $O_{11}$ relative to the fixed part 17.

Further, a movable electrode 22b located adjacent to the movable electrode 22a has an overlap dimension $O_{12}$ relative to the fixed part 17. A total overlap dimension $O_1$ is calculated by a formula of $O_1=O_{11}+O_{12}+O_{13}+O_{14}+O_{15}$.

As for the fixed part 18 shown in FIG. 6A, a total overlap dimension $O_2$ is calculated by a formula of $O_2=O_{21}+O_{22}+O_{23}+O_{24}+O_{25}+O_{26}$, similar to the total overlap dimension $O_1$.

As shown in FIG. 5A, as for electrode separation distance, when acceleration is not applied, a short distance A and a long distance B are defined between the fixed part 17 and the movable electrode 22.

As shown in FIG. 6A, when acceleration is not applied, the distance A is defined between the fixed part 18 and the movable electrode 22. The distance A is defined on both sides of the movable electrode 22. At least one of the short distance A and the long distance B between the fixed part 17 and the movable electrode 22 is made equal to a distance between the fixed part 18 and the movable electrode 22.

The total overlap dimension $O_1$, $O_2$, the thickness Ts, the side face area S, the distance A, B are constant and can be determined in advance.

Acceleration in the plane direction of the support board 12 is detected by the fixed part 17 and the movable part 16.

Figure 5B:
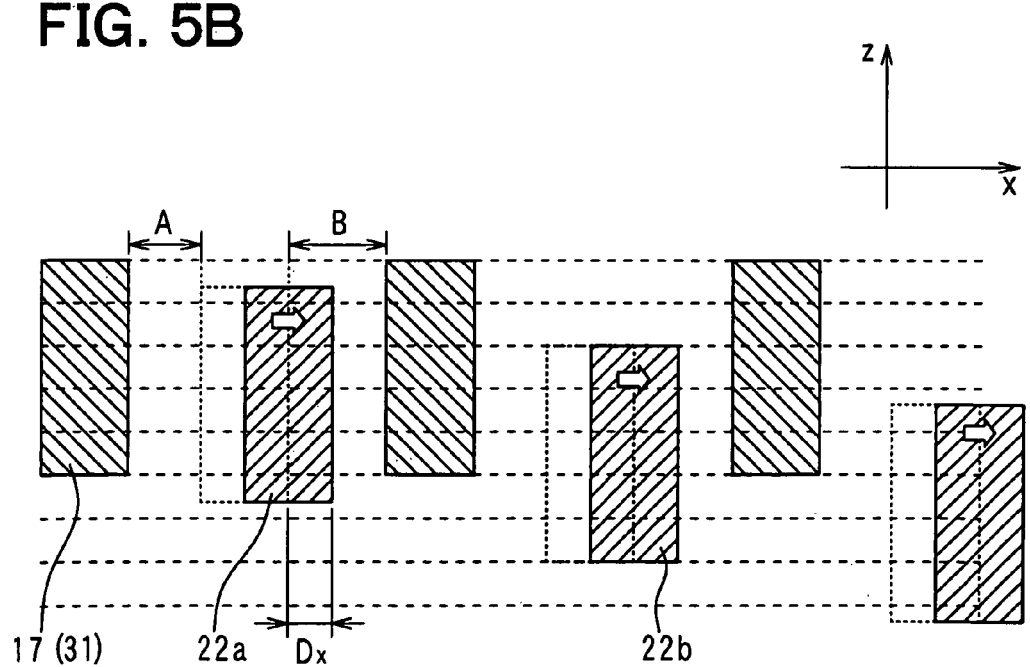
FIG. 5B is a schematic view illustrating the position relationship when acceleration is applied in a horizontal direction.

Specifically, a capacitance corresponding to a separation distance between the movable electrode 22 and the fixed electrode 31 of the fixed part 17 is detected. As shown in FIG. 5B, an x-axis direction is defined to be the plane direction of the support board 12, and a z-axis direction is defined to be the perpendicular direction perpendicular to the plane direction. The x-axis direction corresponds to a direction in which the fixed part 17 and the movable electrode 22 oppose to each other. The separation distance is increased or decreased in the x-axis direction.

When the capacitance is increased compared with a case in which acceleration is not applied, the separation distance can be determined to become short. Thus, the acceleration is determined to be applied in a direction heading from the fixed electrode 31 toward the movable electrode 22.

In contrast, when the capacitance is decreased compared with a case in which acceleration is not applied, the separation distance can be determined to become long. Thus, the acceleration is determined to be applied in a direction heading from the movable electrode 22 toward the fixed electrode 31. Therefore, a value and a direction of the acceleration in the plane direction of the support board 12 can be obtained.

In contrast, acceleration in the perpendicular direction of the support board 12 is detected by the fixed part 18 and the movable part 16. An initial position of the movable electrode 22 is moved in the perpendicular direction relative to the fixed electrode 33 in accordance with a displacement of the beam support 25. Therefore, the acceleration in the perpendicular direction can be detected, in a manner that the opposing area between the fixed electrode 33 and the movable electrode 22 is decreased.

Specifically, when acceleration is applied to the movable electrode 22 in the perpendicular direction, the weight 21 is moved in the perpendicular direction. When the capacitance is increased compared with a case in which acceleration is not applied, the opposing area is increased. Thus, the movable electrode 22 is determined to move toward the cap 11. Therefore, the acceleration is determined to be applied in a direction heading from the cap 11 toward the sensor part 10.

In contrast, when the capacitance is decreased compared with a case in which acceleration is not applied, the opposing area is decreased. Thus, the movable electrode 22 is determined to move toward the support board 12. Therefore, the acceleration is determined to be applied in a direction heading from the sensor part 10 toward the cap 11. Accordingly, a value and a direction of the acceleration in the perpendicular direction of the support board 12 can be obtained.

Specific logic to detect acceleration will be described. Formulas 1, 2, 3 and 4 are described as for a capacitance variation of a capacitor defined between the fixed electrode 31 of the fixed part 17 and the movable electrode 22.

Formula 1 represents a capacitance $C_{10}$ of the capacitor between the fixed part 17 and the movable electrode 22 when acceleration is not applied in the x-axis direction or the z-axis direction.

$$C_{10} = \left(\frac{S}{A} + \frac{S}{B}\right) \cdot \frac{Ts}{O_1} = \frac{A+B}{AB} S \cdot \frac{Ts}{O_1} \quad \text{Formula 1}$$

Formula 2 represents a capacitance $C_{1x}$ of the capacitor between the fixed part 17 and the movable electrode 22 when acceleration is applied only in the x-axis direction. As shown in FIG. 5B, in Formula 2, due to the acceleration applied in the x-axis direction, the separation distance between the fixed part 17 and the movable electrode 22 is changed by a displacement of Dx.

$$C_{1x} = \left(\frac{S}{A+Dx} + \frac{S}{B-Dx}\right) \cdot \frac{Ts}{O_1} = \frac{(A+B)S}{(A+Dx)(B-Dx)} \cdot \frac{Ts}{O_1} \quad \text{Formula 2}$$

Figure 6B:
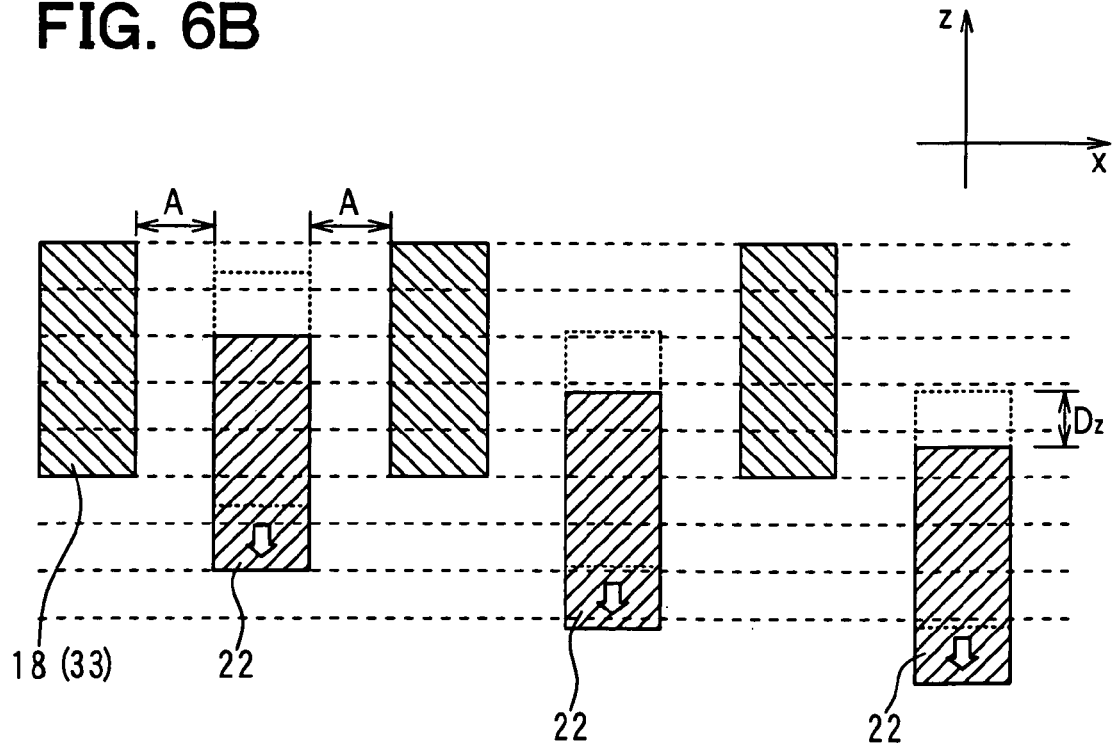
FIG. 6B is a schematic view illustrating the position relationship when acceleration is applied in a perpendicular direction.

Formula 3 represents a capacitance $C_{1z}$ of the capacitor between the fixed part 17 and the movable electrode 22 when acceleration is applied only in the z-axis direction. As shown in FIG. 6B, in Formula 3, due to the acceleration applied in the z-axis direction, z-axis position of the movable electrode 22 is changed by a displacement of Dz, compared with an initial state shown in FIG. 6A in which the acceleration is not applied in the z-axis direction.

$$C_{1z} = \frac{A+B}{AB} S \cdot \frac{Ts}{O_1} \cdot Dz \quad \text{Formula 3}$$

Formula 4 represents a capacitance $C_{1xz}$ of the capacitor between the fixed part 17 and the movable electrode 22 when acceleration is applied in both of the x-axis direction and the z-axis direction. Formula 4 can be defined by using Formula 2 and Formula 3.

The separation distance between the fixed part 17 and the movable electrode 22 is changed by the displacement of Dx due to the acceleration applied in the x-axis direction, and the z-axis position of the movable electrode 22 is changed by the displacement of Dz due to the acceleration applied in the z-axis direction, compared with the initial state in which the acceleration is not applied in the z-axis direction.

$$C_{1xz} = \frac{(A+B)S}{(A+Dx)(B-Dx)} \cdot \frac{Ts}{O_1} \cdot Dz \quad \text{Formula 4}$$

Formulas 5, 6, 7 and 8 are described as for a capacitance variation of a capacitor defined between the fixed electrode 33 of the fixed part 18 and the movable electrode 22.

Formula 5 represents a capacitance $C_{20}$ of the capacitor between the fixed part 18 and the movable electrode 22 when acceleration is not applied in the x-axis direction or the z-axis direction.

$$C_{20} = \left(\frac{S}{A} + \frac{S}{A}\right) \cdot \frac{Ts}{O_2} \qquad \text{Formula 5}$$

Formula 6 represents a capacitance $C_{2x}$ of the capacitor between the fixed part 18 and the movable electrode 22 when acceleration is applied only in the x-axis direction. In Formula 6, due to the acceleration applied in the x-axis direction, the separation distance between the fixed part 18 and the movable electrode 22 is changed by the displacement of Dx.

$$C_{2x} = \left(\frac{S}{A+Dx} + \frac{S}{A-Dx}\right) \cdot \frac{Ts}{O_2} = \frac{2AS}{(A+Dx)(A-Dx)} \cdot \frac{Ts}{O_2} \qquad \text{Formula 6}$$

Formula 7 represents a capacitance $C_{2z}$ of the capacitor between the fixed part 18 and the movable electrode 22 when acceleration is applied only in the z-axis direction. In Formula 7, due to the acceleration applied in the z-axis direction, z-axis position of the movable electrode 22 is changed by the displacement of Dz, compared with an initial state in which the acceleration is not applied in the z-axis direction.

$$C_{2z} = \left(\frac{S}{A} + \frac{S}{A}\right) \cdot \frac{Ts}{O_2} \cdot Dz \qquad \text{Formula 7}$$

Formula 8 represents a capacitance $C_{2xz}$ of the capacitor between the fixed part 18 and the movable electrode 22 when acceleration is applied in both of the x-axis direction and the z-axis direction. Formula 8 can be defined by using Formula 6 and Formula 7.

The separation distance between the fixed part 18 and the movable electrode 22 is changed by the displacement of Dx due to the acceleration applied in the x-axis direction, and the z-axis position of the movable electrode 22 is changed by the displacement of Dz due to the acceleration applied in the z-axis direction, compared with the initial state in which the acceleration is not applied in the z-axis direction.

$$C_{2xz} = \frac{2AS}{(A+Dx)(A-Dx)} \cdot \frac{Ts}{O_2} \cdot Dz \qquad \text{Formula 8}$$

Some of the movable electrodes 22 oppose to the fixed part 17, and the other of the movable electrodes 22 oppose to the fixed part 18. The movable electrode 22 to detect acceleration in the x-axis direction, and the movable electrode 22 to detect acceleration in the z-axis direction protrude from the same weight 21.

Therefore, when the separation distance between the fixed part 17 and the movable electrode 22 is changed by the displacement of Dx, the separation distance between the fixed part 18 and the movable electrode 22 is also changed by the displacement of Dx. Similarly, when the movable electrode 22 opposing to the fixed part 17 is displaced in the perpendicular direction by the displacement of Dz, the movable electrode 22 opposing to the fixed part 18 is also displaced in the perpendicular direction by the displacement of Dz.

Accordingly, due to following Formulas 9, 10 and 11, the acceleration in the x-axis direction and the acceleration in the z-axis direction can be calculated based on the capacitance $C_{1xz}$ between the fixed part 17 and the movable electrode 22 and the capacitance $C_{2xz}$ between the fixed part 18 and the movable electrode 22. The acceleration in the x-axis direction corresponds to the displacement Dx in the plane direction, and the acceleration in the z-axis direction corresponds to the displacement Dz in the perpendicular direction.

Formula 9 is defined by Formula 4 and Formula 8. Specifically, the capacitance $C_{1xz}$ between the fixed part 17 and the movable electrode 22 is divided by the capacitance $C_{2xz}$ between the fixed part 18 and the movable electrode 22.

$$\frac{C_{2xz}}{C_{1xz}} = \frac{\frac{2AS}{(A+Dx)(A-Dx)} \cdot \frac{Ts}{O_2} \cdot Dz}{\frac{(A+B)S}{(A+Dx)(B-Dx)} \cdot \frac{Ts}{O_1} \cdot Dz} = \frac{2A(B-Dx)O_1}{(A-Dx)(A+B)O_2} \qquad \text{Formula 9}$$

Formula 10 is changed from the formula 9 so as to define the displacement Dx of the movable electrode 22. Thus, the displacement Dx of the movable electrode 22 can be calculated based on the capacitance $C_{1xz}$ between the fixed part 17 and the movable electrode 22 and the capacitance $C_{2xz}$ between the fixed part 18 and the movable electrode 22. The displacement Dx corresponds to the acceleration in the x-axis direction.

$$Dx = \frac{2ABC_{1xz}O_1 - A^2 C_{2xz}O_2 - ABC_{2xz}O_2}{2AC_{1xz}O_1 - AC_{2xz}O_2 - BC_{2xz}O_2} \qquad \text{Formula 10}$$

Formula 11 is defined by the formula 4 and the formula 10 so as to calculate the displacement Dz of the movable electrode 22. The displacement Dz corresponds to the acceleration in the z-axis direction.

$$Dz = \frac{O_2}{Ts} \cdot \frac{(A+Dx)(A-Dx)}{2AS} \qquad \text{Formula 11}$$

According to the first embodiment, the projection 29 of the cap 11 displaces the beam support 25 of the sensor part 10 toward the support board 12. Therefore, the initial position of the movable electrode 22 can be moved toward the support board 12 relative to the fixed electrode 31, 33. Thus, the opposing area between the movable electrode 22 and the fixed electrode 31, 33 can be reduced before acceleration is applied to the acceleration sensor.

When acceleration is applied in the perpendicular direction of the support board 12, a heading direction of the acceleration in the perpendicular direction can be detected by a change of the capacitance based on the opposing area between the movable electrode 22 and the fixed electrode 33. That is, the acceleration can be determined to be applied toward the cap 11 or the sensor part 10.

The acceleration in the plane direction can be also detected by a change, of the capacitance based on the separation distance between the movable electrode 22 and the fixed electrode 31 of the fixed part 17. Accordingly, two-axis acceleration can be detected by a single sensor structure.

Because the third beam 26 has the wave shape, a connection distance can be made long between the output 20 and the beam support 25 fixed by the projection 29. Therefore, stress interference to the beam support 25 by the output 20 can be reduced. Accordingly, accuracy for detecting acceleration can be improved.

The beam support 25 may correspond to a float portion, and the projection 29 may correspond to a displacing portion. The movable part 16 and the fixed part 17, 18 may correspond to a sensor structure.

Second Embodiment

A beam support 25 is displaced by electrostatic force in a second embodiment.

Figure 7:
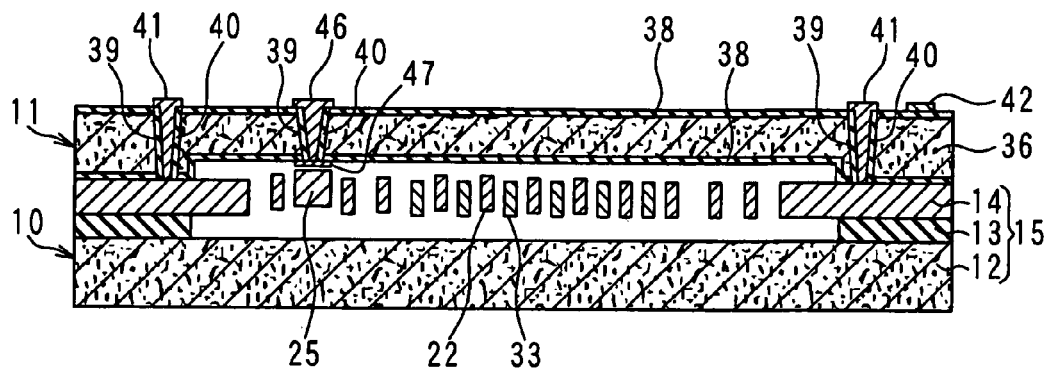
FIG. 7 is a schematic cross-sectional view illustrating an acceleration sensor according to a second embodiment.

FIG. 7 corresponds to a view taken along line IB-IB of FIG. 1A, and a structure of a sensor part 10 is similar to that shown in FIGS. 1A and 1B.

A cap 11 has an electrode 46 and a pad 47 located to oppose to the beam support 25. The electrode 46 and the pad 47 may correspond to a displacing portion for displacing the beam support 25 so as to change a predetermined interval between a support board 12 and the beam support 25. Specifically, an insulation film 40 is formed on a side wall of a hole 39 defined in a silicon substrate 36, and the electrode 46 is arranged on the insulation film 40, similar to an output electrode 41.

The pad 47 is arranged on an oxide film 38 layered on a face of the cap 11 opposing to the sensor part 10, and is positioned to correspond to the electrode 46. The pad 47 is positioned to further correspond to the beam support 25 of the sensor part 10. A plane size of the pad 47 is approximately equal to that of the beam support 25, for example, and the pad 47 is electrically connected to the electrode 46.

When voltage is applied to the electrode 46 of the cap 11 from an outside circuit, for example, electrostatic force is generated between the pad 47 and the beam support 25. Therefore, the beam support 25 is pulled toward the cap 11. Thus, the predetermined interval between the support board 12 and the beam support 25 is increased.

A displacement dimension of the beam support 25 toward the pad 47 is determined by the electrostatic force corresponding to a value of the voltage applied to the electrode 46. After a position of the beam support 25 is fixed, a weight 21 of a movable part 16 vibrates between a first output 19 and the beam support 25, due to spring characteristics of the beams 23, 24.

Because the beam support 25 is pulled toward the cap 11, the second beam 24 connected to the beam support 25 is also indirectly moved toward the cap 11. Therefore, the first beam 23 is positioned adjacent to the cap 11 compared with the output 19. The weight 21 is positioned adjacent to the cap 11 compared with the first beam 23. The second beam 24 is positioned adjacent to the cap 11 compared with the weight 21. A third beam 26 is positioned adjacent to the cap 11 compared with an output 20.

Thus, the movable electrode 22 is moved toward the cap 11, compared with the fixed electrode 31, 33. The opposing area between the fixed electrode 31, 33 and the movable electrode 22 becomes small, when the beam support 25 is pulled toward the cap 11.

The displacement amount of the beam support 25 is controlled by changing the voltage applied to the electrode 46.

Figure 8A:
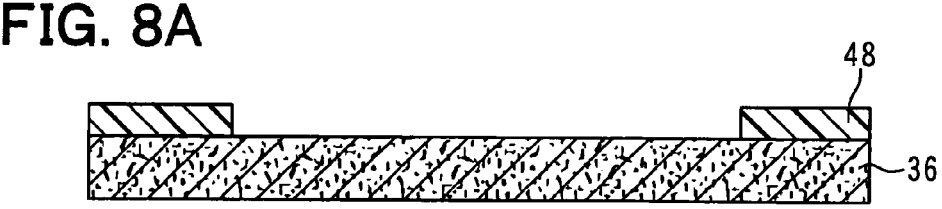
FIG. 8A is.

A method of producing the acceleration sensor shown in FIG. 7 will be described. As shown in FIG. 8A, the silicon substrate 36 to be the cap 11 is prepared, and a photo resist 48 is formed on the silicon substrate 36 for patterning a recess 37 to be opened. The silicon substrate 36 is etched by using the photo resist 48 as a mask so as to form the recess 37. The photo resist 48 is removed after the etching is finished.

The oxide film 38 is formed on a first face of the silicon substrate 36 to oppose to the sensor part 10, and a second face of the silicon substrate 36 opposite from the sensor part 10.

Figure 8B:
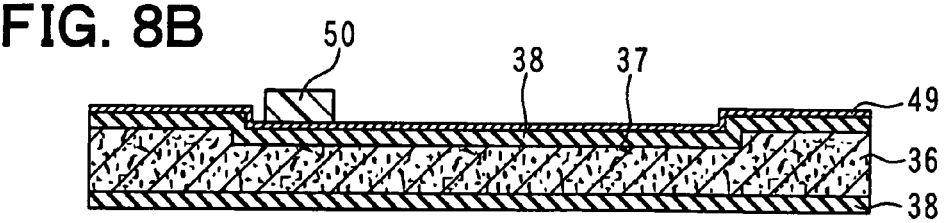
FIG. 8B and FIG. 8C are schematic cross-sectional views illustrating processes of producing a cap of the acceleration sensor of the second embodiment.
Figure 8C:
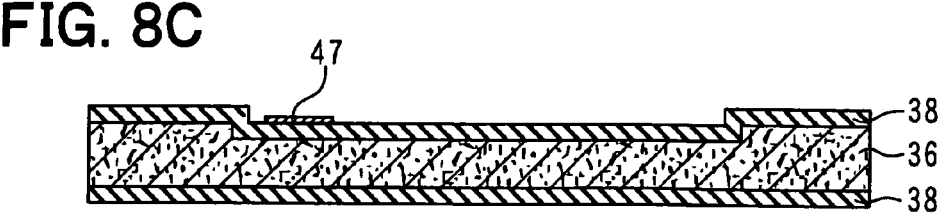

As shown in FIG. 8B, a metal layer 49 is formed on the oxide film 38 to oppose the sensor part 10, and a photo resist 50 is arranged on the metal layer 49 to be the pad 47. As shown in FIG. 8C, the metal layer 49 is etched by using the photo resist 50 as a mask, so as to form the pad 47. The photo resist 50 is removed after the etching is finished. Thus, the cap 11 not having the electrodes 41, 46 is produced.

The sensor part 10 is prepared by the processes shown in FIGS. 2A, 2B and 2C.

Figure 9A:
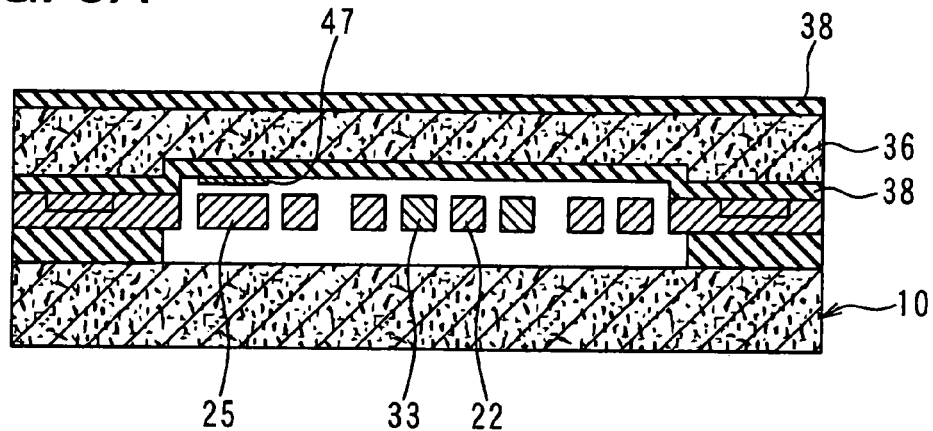
FIG. 9A and FIG. 9B are schematic cross-sectional views illustrating processes of connecting a sensor part and the cap of the second embodiment.

As shown in FIG. 9A, the sensor part 10 and the cap 11 are directly joined, similar to the process shown in FIG. 4A. Thus, the sensor structure is covered by the support board 12 and the cap 11.

Figure 9B:
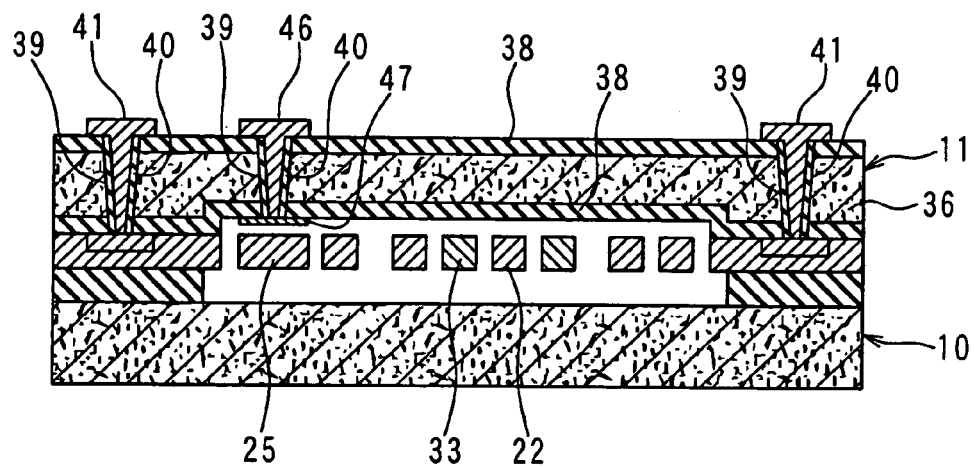

As shown in FIG. 9B, the electrodes 41, 46 are formed in the cap 11. The forming of the electrode 41 is performed similarly to the process shown in FIG. 4B.

The forming of the electrode 46 is performed similarly to that of the electrode 41. The hole 39 is formed by etching the cap 11 opposing to the beam support 25. At this time, the etching is performed by using the pad 47 as a stopper. The insulation film 40 is formed on the side wall of the hole 39, and the electrode 46 is formed on the insulation film 40. Thus, the acceleration sensor of the second embodiment is produced.

As shown in FIG. 9B, the beam support 25 is not displaced, when voltage is not applied to the electrode 46. However, when voltage is applied to the electrode 46, as shown in FIG. 7, the beam support 25 is displaced. Acceleration is detected in the state that the beam support 25 is displaced.

Because the beam support 25 is displaced toward the cap 11, the opposing area between the movable electrode 22 and the fixed electrode 31, 33 is decreased. Therefore, a value and a direction of acceleration in both of the plane direction and the perpendicular direction of the support board 12 can be detected, similarly to the first embodiment.

According to the second embodiment, due to the electrode 46 arranged in the cap 11, the beam support 25 separated from the support board 12 is displaced toward the cap 11.

The support board 25 can be easily displaced toward the cap 11 only by applying voltage to the electrode 46. Further, the displacement amount of the support beam 25 can be accurately controlled by controlling a value of the voltage applied to the electrode 46.

When detection accuracy of acceleration in the plane direction is required to be improved, the beam support 25 is restricted from moving so as to increase the opposing area between the movable electrode 22 and the fixed electrode 31.

In contrast, when detection accuracy of acceleration in the perpendicular direction is required to be improved, the displacement of the beam support 25 is made larger so as to decrease the opposing area between the movable electrode 22 and the fixed electrode 31.

If the beam support 25 contacts the pad 47, the electrode 46 can be used for outputting a signal of the movable part 16.

The electrode 46 and the pad 47 may correspond to an electrode part.

Third Embodiment

An output electrode 54 is arranged in a sensor part 10 in a third embodiment, while the output electrode 41 is arranged in the cap 11 in the first and second embodiments. Further, a displacing portion displacing a beam support 25 is arranged in the sensor part 10.

Figure 10:
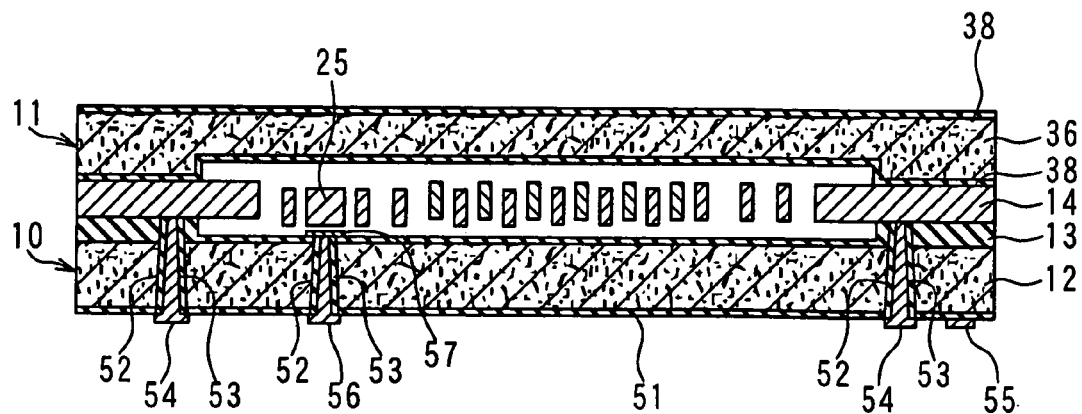
FIG. 10 is a schematic cross-sectional view illustrating an acceleration sensor according to a third embodiment.

FIG. 10 corresponds to a view taken along line IB-IB of FIG. 1A. As shown in FIG. 10, no electrode is arranged in a cap 11.

A buried oxide film 13 is left on a support board 12 opposing to the cap 11, and an oxide film 51 is formed on the support board 12 opposite from the cap 11.

A hole 52 is defined to pass through the oxide film 51, the support board 12 and the buried oxide film 13. An output 19, 20, 34, 35 is exposed to the hole 52. An insulation film 53 is formed on a side wall of the hole 52, and the output electrode 54 is arranged in the hole 52 through the insulation film 53. An output electrode 55 for the cap 11 is also arranged on the sensor part 10.

Further, an electrode 56 is arranged in the support board 12 opposing to a beam support 25. The electrode 56 may correspond to a displacing portion. Specifically, the hole 52 is defined to pass through the oxide film 51, the support board 12 and the buried oxide film 13. The insulation film 53 is formed on the side wall of the hole 52. The electrode 56 is arranged in the hole 52 through the insulation film 53.

Further, a pad 57 is arranged on the buried oxide film 13 of the sensor part 10. The pad 57 is located to oppose to the beam support 25, and is electrically connected to the electrode 56.

When voltage is applied to the electrode 56 of the sensor part 10 from an outside circuit, electrostatic force is generated between the pad 57 and the beam support 25. Therefore, the beam support 25 is pulled toward the support board 12, and a predetermined interval between the support board 12 and the beam support 25 is decreased.

A method of producing the acceleration sensor of the third embodiment will be described. The sensor part 10 having the sensor structure on the support board 12 is prepared. However, the sensor part 10 may not have the electrode 56, at this time. The cap 11 made of the silicon substrate 36 having the recess 37 and the oxide film 38 is prepared. The sensor part 10 and the cap 11 are joined so as to cover the sensor structure by the support board 12 and the cap 11.

The hole 52, the insulation film 53, and the electrode 54, 56 are formed in the sensor part 10 corresponding to the output 19, 20, 34, 35 and the beam support 25. Thus, the acceleration sensor shown in FIG. 10 can be produced. As for the pad 57, a metal layer is formed between the buried oxide film 13 and the silicon layer 14, and the metal layer is etched so as to form the pad 57 when the sensor structure is formed.

According to the third embodiment, due to the electrode 56 arranged in the sensor part 10, the beam support 25 separated from the support board 12 is displaced toward the sensor part 10. Therefore, the beam support 25 can be moved toward the support board 12, and the movable electrode 22 can be displaced relative to the fixed electrode 31, 33 in the perpendicular direction of the support board 12 in advance.

Because all of the electrodes such as the output electrode 54 and the electrode 56 are arranged in the sensor part 10, the cap 11 may be eliminated. However, if the acceleration sensor includes the cap 11, the sensor structure of the sensor part 10 can be protected by the cap 11.

The electrode 56 and the pad 57 may correspond to an electrode part.

Fourth Embodiment

A movable part 16 has a seesaw structure in a fourth embodiment.

FIG. 11A shows an acceleration sensor according to the fourth embodiment, and FIG. 11B is a cross-sectional view taken along line XIB-XIB of FIG. 11A.

As shown in FIG. 11A, the movable part 16 includes a connector 58, a beam 59 and a weight 60. The connector 58 has plural movable electrodes 22 extending in a direction perpendicular to a longitudinal direction of the connector 58.

The connector 58 is supported by a support board 12 through the beam 59 having spring characteristics, such that the connector 58 can be moved like a seesaw. Further, the weight 60 is connected to an end of the connector 58, and has etching holes 61.

A part of the beam 59 of the movable part 16 is fixed to the support board 12 through a buried oxide film 13. In contrast, the connector 58, the movable electrode 22 and the weight 60 are separated from the support board 12.

A fixed part 17 used for a plane direction detection is located adjacent to the weight 60, and a fixed part 18 used for a perpendicular direction detection is located to oppose the fixed part 17 through the beam 59. The fixed parts 17, 18 are located opposite from each other relative to the beam 59, and the locations of the fixed parts 17, 18 may be reversed.

As shown in FIG. 11B, a hole 39 is defined to pass through the cap 11 opposing to the weight 60, and an electrode 46 is arranged in the hole 39 through an insulation film 40 formed on a side wall of the hole 39. Further, a pad 47 is arranged on an oxide film 38 formed on a face of the cap 11 opposing to the sensor part 10, and the pad 47 is located to oppose to the weight 60.

When voltage is applied to the electrode 46, the weight 60 is displaced toward the cap 11. At this time, a clearance is defined between the pad 47 and the weight 60, such that the weight 60 is not contact with the pad 47. Therefore, the weight 60 can be displaced when acceleration is applied.

According to the fourth embodiment, the movable part 16 of the acceleration sensor has the seesaw structure. A displacement of the movable part 16 is similar to a seesaw movement. The weight 60 can be displaced in the perpendicular direction of the support board 12. Alternatively, the electrode 46 may be arranged in the sensor part 10, and the weight 60 may be displaced toward the support board 12, similarly to the third embodiment.

Fifth Embodiment

An acceleration sensor of a fifth embodiment detects three-axis acceleration including two in a plane direction and one in a perpendicular direction, while the acceleration sensor of the first, second, third or fourth embodiment detects two-axis acceleration including one in the plane direction and one in the perpendicular direction.

Figure 12:
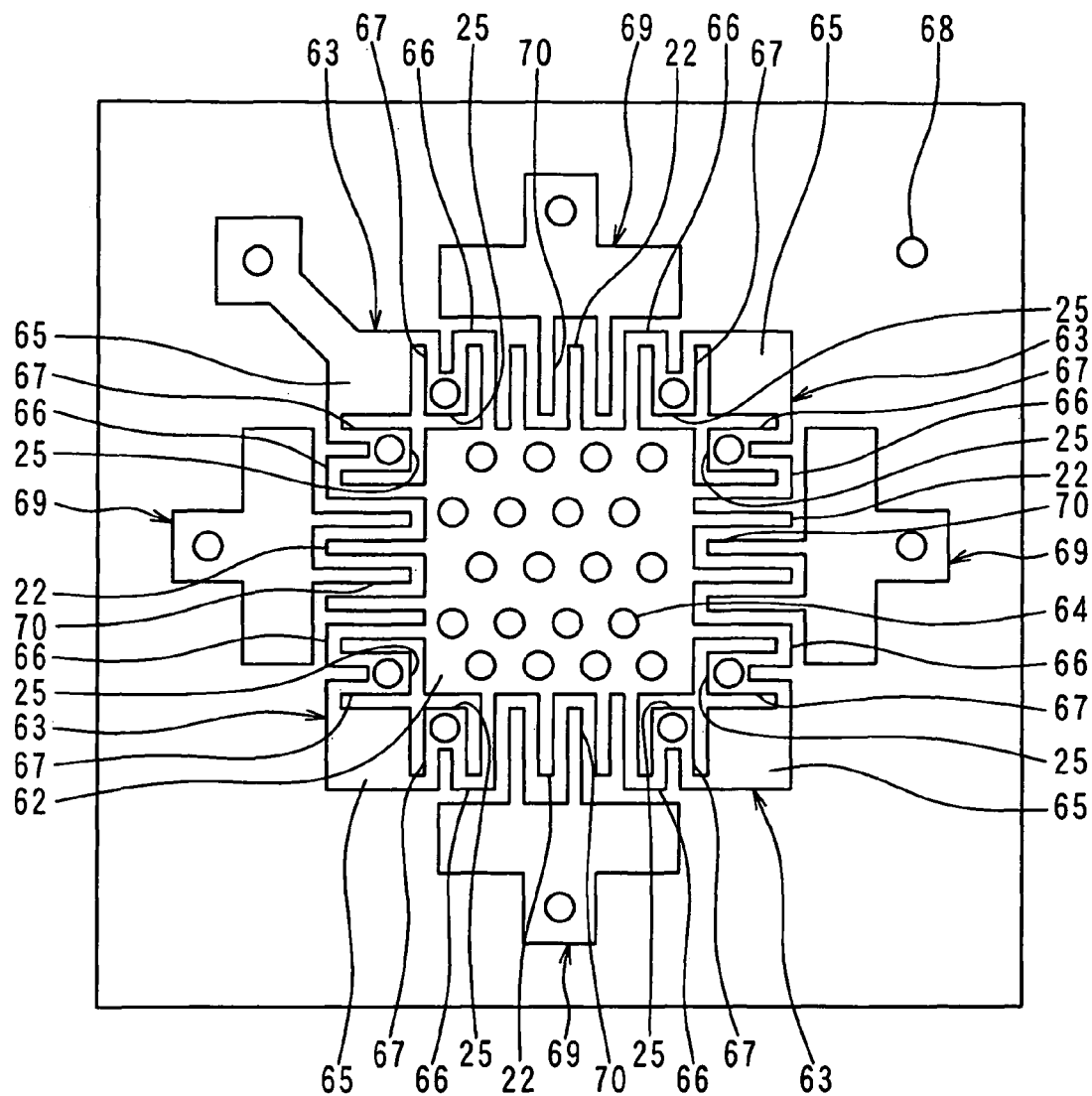
FIG. 12 is a schematic plan view illustrating an acceleration sensor according to a fifth embodiment.

As shown in FIG. 12, a movable part 16 has a weight 62 and a beam part 63.

The weight 62 is shaped in a rectangle, and has plural movable electrodes 22 extending in a direction perpendicular to each side of the rectangle. Etching holes 64 are defined in the weight 62.

The beam part 63 has four supports 65, eight of fourth beams 66 and eight of fifth beams 67. The support 65 is positioned to oppose each corner portion of the weight 62, and is fixed to a support board 12 through an oxide film 13.

An end of the fourth beam 66 is connected the corner portion of the weight 62, and the other end of the fourth beam 66 is connected to a beam support 25. The fourth beam 66 has spring characteristics and wave shape.

An end of the fifth beam 67 is connected the beam support 25, and the other end of the fifth beam 67 is connected to the support 65. The fifth beam 67 has spring characteristics. The movable part 16 has eight of the beam supports 25.

One of the supports 65 is electrically connected to outside. An output electrode 68 for the cap 11 is arranged in the cap 11.

Four fixed parts 69 are located to oppose to four sides of the weight 62, respectively. The fixed part 69 has a fixed electrode 70 extending toward the weight 62, and the fixed electrode 70 is located to oppose to the movable electrode 22. Some of the fixed parts 69 are used for detecting acceleration in the plane direction, and the others of the fixed parts 69 are used for detecting acceleration in the perpendicular direction.

According to the fifth embodiment, at least one of the beam supports 25 is displaced toward the support board 12, due to the projection 29 arranged on the cap 11 of the first embodiment, for example. Because the movable electrode 22 is moved in the perpendicular direction of the support board 12 relative to the fixed electrode 70, acceleration in the perpendicular direction can be detected. Alternatively, the displacement of the beam support 25 may be performed by using electrostatic force.

Further, the weight 62 has the rectangular shape, and separation distance between the movable electrode 22 and the fixed electrode 70 is defined each side of the rectangular shape. Therefore, acceleration in a first plane direction and acceleration in a second plane direction perpendicular to the first plane direction can be detected based on capacitances corresponding to the separation distances. Thus, three-axis acceleration can be detected.

The beam 66 may correspond to a first beam, and the beam 67 may correspond to a second beam.

Other Embodiment

The projection 29 is arranged on the cap 11 in the first embodiment. Alternatively, the projection 29 may be arranged on the beam support 25.

The plane size of the projection 29 is smaller than that of the beam support 25 in the first embodiment. Alternatively, the plane size of the projection 29 may be equal to or larger than that of the beam support 25. The plane size of the projection 29 is set disable to contact the second beam 24 or the third beam 26. The beam support 25 and the projection 29 may be solidly connected to each other by using anode connection or bonding.

Figure 13:
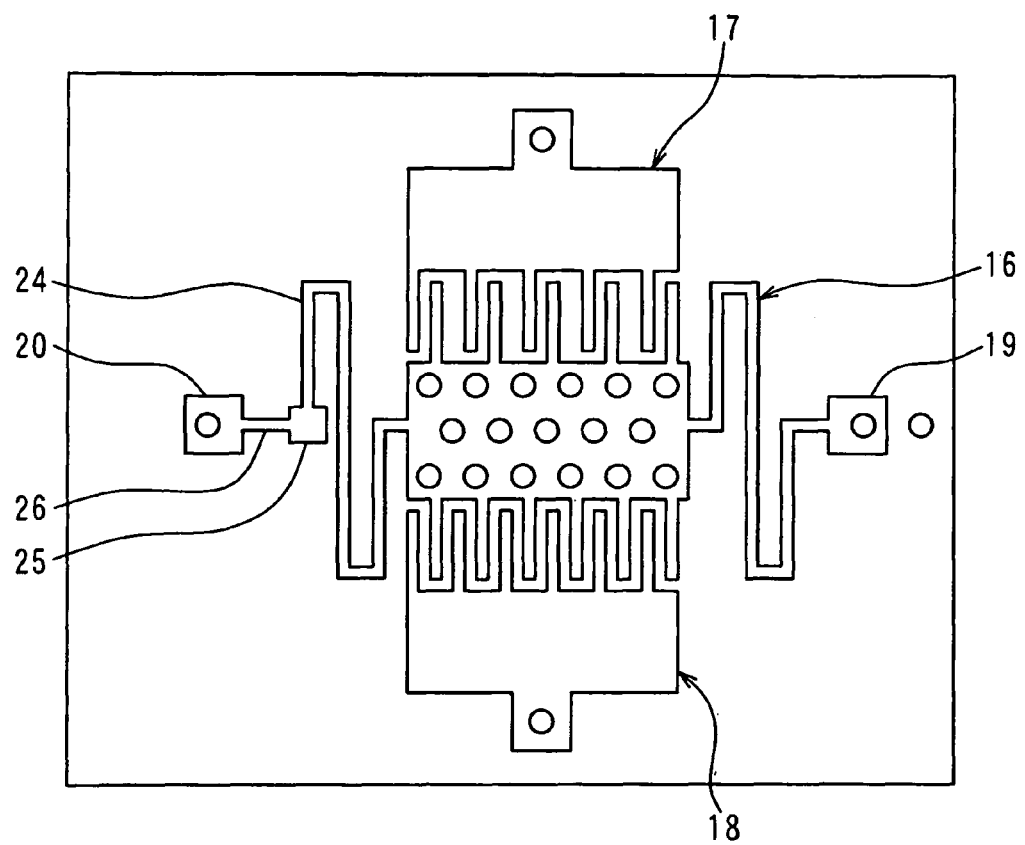
FIG. 13 is a schematic plan view illustrating an acceleration sensor according to other embodiment.

The third beam 26 connecting the beam support 25 and the second output 20 has wave shape in the first embodiment. However, the third beam 26 may have other shape. For example, as shown in FIG. 13, the third beam 26 may have a linear shape to connect the beam support 25 and the second output 20. In this case, the third beam 26 has high strength in the longitudinal direction. If the weight 21 vibrates in the longitudinal direction, the beam support 25 can be sufficiently fixed relative to the longitudinal direction. Therefore, accuracy for detecting acceleration can be improved.

All of the electrodes such as the electrode 56 and the output electrode 54 are arranged in the sensor part 10 in the third embodiment. Alternatively, the output electrode 54 may be arranged in the cap 11.

The electrode 46 displacing the beam support 25 is arranged in the cap 11 in FIG. 7, and the electrode 56 displacing the beam support 25 is arranged in the sensor part 10 in FIG. 10.

Figure 14:
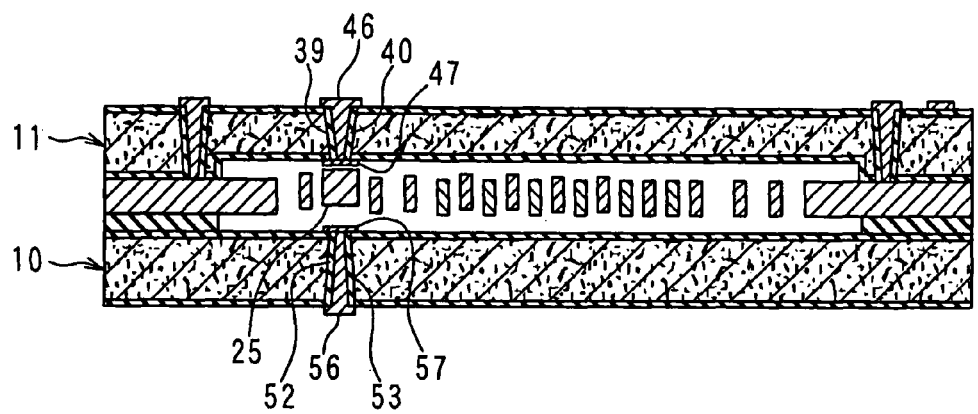
FIG. 14 is a schematic cross-sectional view illustrating an acceleration sensor according to other embodiment.

Alternatively, as shown in FIG. 14, the acceleration sensor may have both of the electrode 46 arranged in the cap 11 and the electrode 56 arranged in the sensor part 10. In this case, the displacement amount of the beam support 25 can be changed from both sides, such that position accuracy of the beam support 25 can be improved. The electrode 46 may correspond to a first electrode, and the electrode 56 may correspond to a second electrode.

The movable electrode 22 is displaced in the perpendicular direction of the support board 12 in accordance with the beam support 25. However, the movable electrode 22 may become inclined relative to the fixed electrode 31, 33, due to the displacement. If the position of the electrode 56 is moved toward the weight 21, the movable electrode 22 can be made parallel to the fixed electrode 31, 33. Thus, the electrode 46, 56 is not limited to oppose to the beam support 25. The position of the electrode 46, 56 is set able to apply the electrostatic force to the support beam 25.

Figure 15:
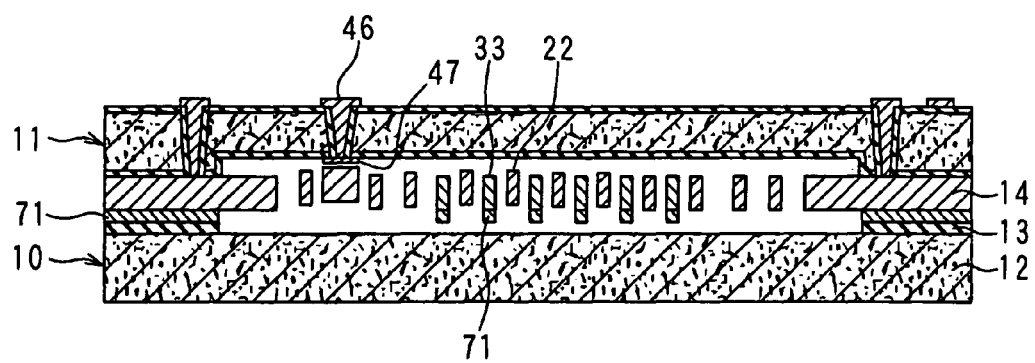
FIG. 15 is a schematic cross-sectional view illustrating an acceleration sensor according to other embodiment.

As shown in FIG. 15, a bottom electrode 71 may be arranged between the buried oxide film 13 and the silicon layer 14, in the second embodiment, for example. Thus, electricity can be easily supplied to the movable electrode 22 and the fixed electrode 31, 33, 70. The bottom electrode 71 may be arranged between the buried oxide film 13 and the silicon layer 14 in above embodiments other than the second embodiment.

The bottom electrode 71 is located between the oxide film 13 and the output 19, 20, 34, 35 of the movable part 16. Further, the fixed electrode 31, 33 and the wiring 30, 32 of the fixed part 17, 18 are formed on the bottom electrode 71. At this time, the fixed electrode 31, 33 and the bottom electrode 71 integrated with the fixed electrode 31, 33 are separated from the support board 12.

A metal layer to be the bottom electrode 71 is formed on the oxide film 13, and the silicon layer 14 is formed on the metal layer, so as to form the bottom electrode 71 in the sensor part 10. The bottom electrode 71 is made of poly-silicon, for example. The bottom electrode 71 located between the movable part 16 and the fixed part 17, 18 is eliminated. The movable part 16 and the fixed part 17, 18 are insulated from each other, due to the oxide film 13.

The bottom electrode 71 may be included in all the acceleration sensors of the above embodiments.

A distance between the fixed part 18 and the movable electrode 22 is made equal to the short distance A between the fixed part 17 and the movable electrode 22. Alternatively, the distance between the fixed part 18 and the movable electrode 22 may be made equal to the long distance B between the fixed part 17 and the movable electrode 22.

The movable electrode 22 and the fixed electrode 31, 33, 70 are schematically illustrated. The number and the size of the electrodes 22, 31, 33, 70 are not limited to the illustration.

The acceleration sensor is described as an example of the semiconductor dynamic quantity sensor. Alternatively, the semiconductor dynamic quantity sensor may be other sensor for detecting other dynamic quantity such as angular speed.

Figure 16A:
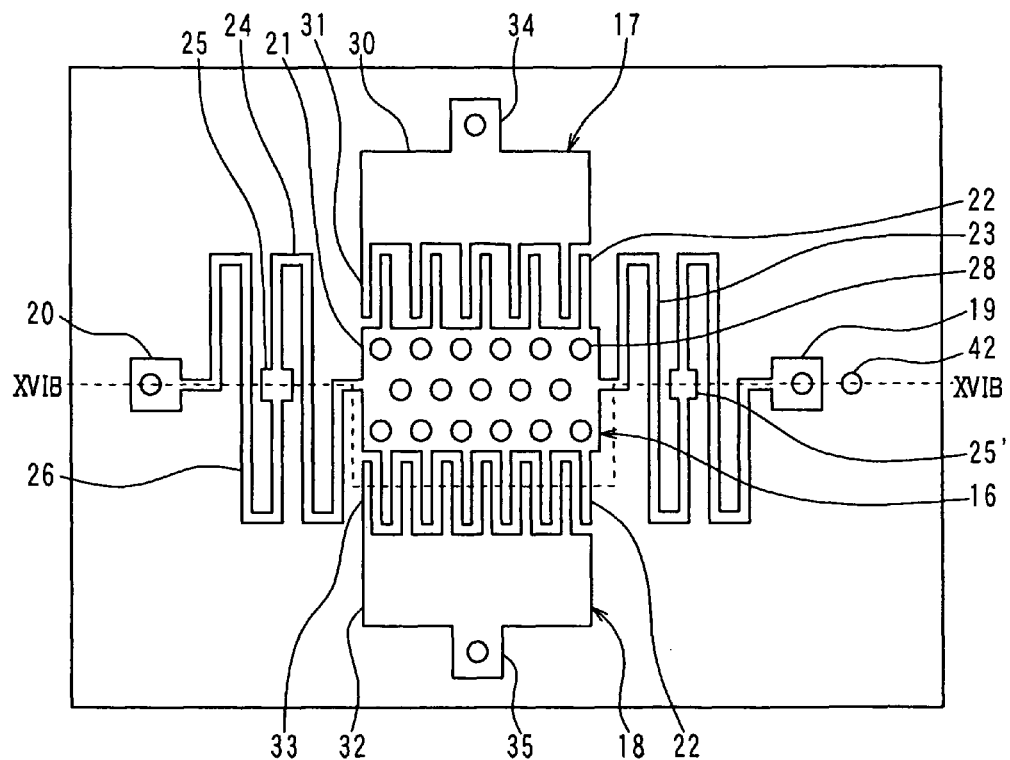
FIG. 16A is a schematic plan view illustrating an acceleration sensor according to other embodiment.
Figure 16B:
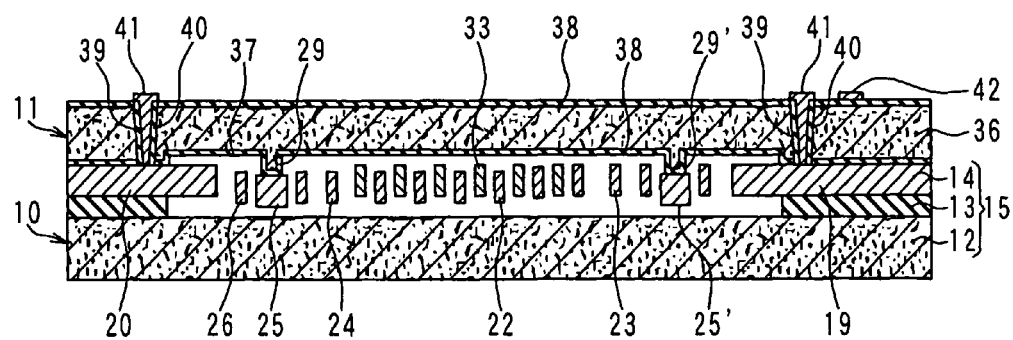
FIG. 16B is a schematic cross-sectional view taken along line XVIB-XVIB of FIG. 16A.

As shown in FIG. 16A, a beam support 25' may be arranged on right side, similar to the beam support 25 arranged on left side, compared with FIG. 1A. As shown in FIG. 16B, the cap 11 may have a projection 29' protruding from the cap 11, and the beam support 25' is displaced by the projection 29'. The projection 29' may correspond to a displacing portion, similar to the projection 29. Thus, the beam support 25 and the projection 29 may be arranged at plural positions so as to change the predetermined interval between the beam support 25 and the support board 12.

Figure 17:
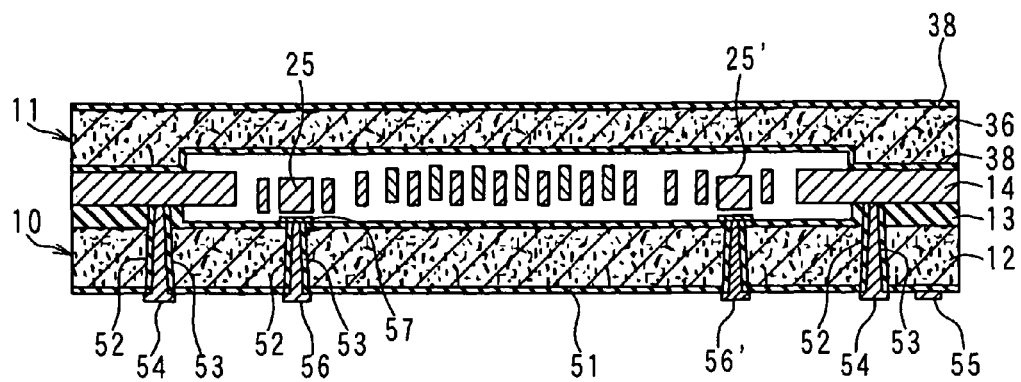
FIG. 17 is a schematic cross-sectional view illustrating an acceleration sensor according to other embodiment.

As shown in FIG. 17, a beam support 25' may be arranged on right side, similar to the beam support 25 arranged on left side, compared with FIG. 10. The support board 12 may have an electrode 56', and the beam support 25' is displaced by the electrode 56', when voltage is applied to the electrode 56'. The electrode 56' may correspond to a displacing portion, similar to the electrode 56. Thus, the beam support 25 and the electrode 56 may be arranged at plural positions so as to change the predetermined interval between the beam support 25 and the support board 12.

Figure 18:
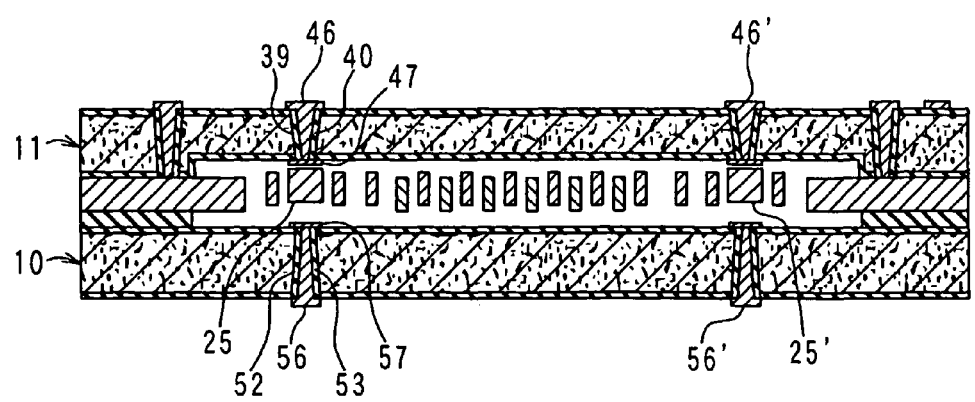
FIG. 18 is a schematic cross-sectional view illustrating an acceleration sensor according to other embodiment.

As shown in FIG. 18, a beam support 25' may be arranged on right side, similar to the beam support 25 arranged on left side, compared with FIG. 14. The support board 12 may have an electrode 56', and the cap 11 may have an electrode 46'. The electrode 56', 46' may correspond to a displacing portion, similar to the electrode 56, 46. Thus, the beam support 25 and the electrodes 46, 56 may be arranged at plural positions so as to control the predetermined interval between the beam support 25 and the support board 12.

Such changes and modifications are to be understood as being within the scope of the present invention as defined by the appended claims.

What is claimed is:

1. A semiconductor dynamic quantity sensor comprising:
    a sensor part having a support board and a sensor structure arranged on the support board, the sensor structure including a movable part having a movable electrode and a fixed part having a fixed electrode so as to detect a dynamic quantity based on a capacitance of a capacitor defined between the movable electrode and the fixed electrode; and
    a cap connected to the sensor part so as to cover the sensor structure between the cap and the support board, wherein
    the movable part has a float portion separated from the support board to define a predetermined interval between the float portion and the support board,
    at least one of the cap and the support board has a displacing portion displacing the float portion in a direction perpendicular to the support board so as to change the predetermined interval before the dynamic quantity is applied,
    the movable electrode has a displacement in the perpendicular direction relative to the fixed electrode in accordance with the displaced float portion, so as to decrease an overlap area between the movable electrode and the fixed electrode before the dynamic quantity is applied,
    the sensor structure detects the dynamic quantity applied in the perpendicular direction based on a change of the overlap area, when the dynamic quantity is applied to the movable electrode in the perpendicular direction, and
    the sensor structure detects the dynamic quantity applied in a plane direction of the support board based on a separation distance between the movable electrode and the fixed electrode, when the dynamic quantity is applied to the movable electrode in the plane direction.

2. The semiconductor dynamic quantity sensor according to claim 1, wherein
    the displacing portion is a projection protruding from a face of the cap opposing to the sensor structure, and
    the projection is contacted with the float portion pressed toward the support board so as to reduce the predetermined interval.

3. The semiconductor dynamic quantity sensor according to claim 1, wherein
    the displacing portion is an electrode arranged on the cap opposing to the float portion, and
    the float portion is configured to be pulled toward the cap by electrostatic force generated between the electrode and the float portion so as to increase the predetermined interval, when voltage is applied to the electrode.

4. The semiconductor dynamic quantity sensor according to claim 1, wherein
    the displacing portion is an electrode arranged on the support board opposing to the float portion, and
    the float portion is configured to be pulled toward the support board by electrostatic force generated between the electrode and the float portion so as to decrease the predetermined interval, when voltage is applied to the electrode.

5. The semiconductor dynamic quantity sensor according to claim 1, wherein
    the displacing portion is
        a first electrode arranged on the cap opposing to the float portion, and
        a second electrode arranged on the support board opposing to the float portion, and
    the float portion is configured to be displaced by a difference between electrostatic force generated between the first electrode and the float portion and electrostatic force generated between the second electrode and the float portion so as to change the predetermined interval, when voltage is applied to the first electrode and the second electrode.

6. The semiconductor dynamic quantity sensor according to claim 1, wherein
    the movable part includes
        a weight connected to the movable electrode and separated from the support board,
        a first output arranged on the support board,
        a wave-shaped first beam having a first end connected to the weight and a second end connected to the first output, the first beam being separated from the support board and having a spring constant,
        a wave-shaped second beam having a first end connected to the weight opposite from the first beam and a second end connected to the float portion, the second beam being separated from the support board and having the same spring constant as the first beam,
        a second output arranged on the support board, and
        a third beam having a first end connected to the float portion and a second end connected to the second output, the third beam being separated from the support board.

7. The semiconductor dynamic quantity sensor according to claim 6, wherein
    the third beam has wave-like bent shape.

8. The semiconductor dynamic quantity sensor according to claim 6, wherein
    the third beam has a linear shape.

9. The semiconductor dynamic quantity sensor according to claim 6, wherein
    the movable part further includes a buried oxide film arranged on the support board, and a bottom electrode arranged on the buried oxide film,
    the first output and the second output are located on the bottom electrode,
    the fixed part has a wiring connected to the fixed electrode,
    the fixed electrode and the wiring are arranged on the bottom electrode, and
    the fixed electrode and the bottom electrode integrated with the fixed electrode are separated from the support board.

10. The semiconductor dynamic quantity sensor according to claim 1, wherein
    the movable part includes
        a connector connected to the movable electrode and separated from the support board,
        a beam to support the connector relative to the support board so as to displace the connector like a seesaw, the beam having spring characteristics, and
        a weight connected to an end of the connector, and
    the float portion is the weight separated from the support board.

11. The semiconductor dynamic quantity sensor according to claim 10, wherein the movable part further includes a buried oxide film arranged on the support board, and a bottom electrode arranged on the buried oxide film, the beam is located on the bottom electrode, the fixed part has a wiring connected to the fixed electrode, the fixed electrode and the wiring are arranged on the bottom electrode, and the fixed electrode and the bottom electrode integrated with the fixed electrode are separated from the support board.

12. The semiconductor dynamic quantity sensor according to claim 1, wherein the movable part includes a weight having a rectangular shape, the movable electrode being connected to each side of the rectangular shape, four supports, each of which being located to oppose a corner portion of the weight, eight first beams, each of which having a first end connected to the corner portion of the weight and a second end connected to the float portion, and eight second beams, each of which having a first end connected to the float portion and a second end connected to the support, the first beam and the second beam have spring characteristics, the float portion is one of a plurality of float portions located between the first beams and the second beams, and at least one of the float portions has a displacement relative to the support board.

13. The semiconductor dynamic quantity sensor according to claim 12, wherein the movable part further includes a buried oxide film arranged on the support board, and a bottom electrode arranged on the buried oxide film, the support is located on the bottom electrode, the fixed part has a wiring connected to the fixed electrode, the fixed electrode and the wiring are arranged on the bottom electrode, and the fixed electrode and the bottom electrode integrated with the fixed electrode are separated from the support board.

14. A semiconductor dynamic quantity sensor comprising:

a support board; and a sensor structure arranged on the support board, the sensor structure including a movable part having a movable electrode and a fixed part having a fixed electrode so as to detect a dynamic quantity based on a capacitance of a capacitor defined between the movable electrode and the fixed electrode, wherein the movable part has a float portion separated from the support board to define a predetermined interval between the float portion and the support board, the support board has a displacing portion displacing the float portion in a direction perpendicular to the support board so as to change the predetermined interval before the dynamic quantity is applied, the movable electrode has a displacement in the perpendicular direction relative to the fixed electrode in accordance with the displaced float portion, so as to decrease an overlap area between the movable electrode and the fixed electrode before the dynamic quantity is applied, the sensor structure detects the dynamic quantity applied in the perpendicular direction based on a change of the overlap area, when the dynamic quantity is applied to the movable electrode in the perpendicular direction, and the sensor structure detects the dynamic quantity applied in a plane direction of the support board based on a separation distance between the movable electrode and the fixed electrode, when the dynamic quantity is applied to the movable electrode in the plane direction.

* * * * *